United States Patent
Bourgeois et al.

(10) Patent No.: US 9,432,637 B2
(45) Date of Patent: Aug. 30, 2016

(54) SYSTEM AND METHOD FOR AUTOMATED BOTTOM FEATURE NAVIGATOR

(71) Applicant: THE UNITED STATES OF AMERICA, AS REPRESENTED BY THE SECRETARY OF THE NAVY, Washington, DC (US)

(72) Inventors: Brian S Bourgeois, Slidell, LA (US); John R. Dubberley, New Orleans, LA (US); Jeffrey A. Russell, Slidell, LA (US); Marlin L Gendron, Long Beach, MS (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 320 days.

(21) Appl. No.: 14/200,053

(22) Filed: Mar. 7, 2014

(65) Prior Publication Data

US 2014/0320653 A1    Oct. 30, 2014

Related U.S. Application Data

(60) Provisional application No. 61/776,258, filed on Mar. 11, 2013.

(51) Int. Cl.
*H04N 7/18* (2006.01)
*G06K 9/00* (2006.01)
*G06T 7/00* (2006.01)

(52) U.S. Cl.
CPC .......... *H04N 7/183* (2013.01); *G06K 9/00624* (2013.01); *G06T 7/0042* (2013.01); *G06T 2207/10016* (2013.01); *G06T 2207/30252* (2013.01)

(58) Field of Classification Search
None
See application file for complete search history.

(56) References Cited

U.S. PATENT DOCUMENTS 5,493,539 A    2/1996    Haley et al.
7,990,804 B2    8/2011    Gendron
(Continued)

FOREIGN PATENT DOCUMENTS

EP    20060801585    6/2008
EP    20070861237    11/2008

OTHER PUBLICATIONS

Dubberley, John, Bourgeois, Brian, Autonomous Underwater Vehicle (AUV) Terrain Navigation Demonstration, Littoral Battlespace Sensing Newsletter, No. 18, Quarter 4, Fiscal Year 2012, pp. 6-8, Sep. 27, 2012.

(Continued)

*Primary Examiner* — Sath V Perungavoor
*Assistant Examiner* — Janese Duley
(74) *Attorney, Agent, or Firm* — US Naval Research Laboratory; Scott G. Bell

(57) ABSTRACT

System and method for generating vehicle position fixes for an underwater vehicle based on images of a target object on the seafloor. The position of the target object is estimated based on a selected pixel on the target. For each image of the target, there is a different selected pixel, and a different uncertainty associated with the target location based on the selected pixel. Vehicle position fixes for the underwater vehicle are computed based on an analysis of the selected pixels for each target, the uncertainties of the selected pixel positions, the location and uncertainty of location of the vehicle collecting the pixel positions, and other information collected about the target.

19 Claims, 19 Drawing Sheets

(56) References Cited

U.S. PATENT DOCUMENTS

| | | | |
|---|---|---|---|
| 8,442,709 B2 | 5/2013 | Larkin | |
| 2006/0197837 A1 | 9/2006 | Flath et al. | |
| 2009/0164213 A1 | 6/2009 | Lennington et al. | |
| 2009/0287414 A1* | 11/2009 | Vickery | G01C 21/165 701/500 |
| 2010/0036612 A1* | 2/2010 | Vance | B64G 1/242 701/500 |
| 2011/0012719 A1* | 1/2011 | Hilger | H04N 7/181 340/435 |
| 2011/0241930 A1* | 10/2011 | Wood | G01S 7/12 342/93 |
| 2012/0021385 A1* | 1/2012 | Belenkii | G09B 27/00 434/19 |
| 2012/0069709 A1 | 3/2012 | Gendron et al. | |
| 2012/0113145 A1 | 5/2012 | Adhikari et al. | |
| 2013/0100281 A1* | 4/2013 | Sharma | G06K 9/00805 348/135 |

OTHER PUBLICATIONS

Bourgeois, Brian, DR., Dubberley, John and Cronin, Doug, 6.2-6.4 RDT&E Reviews, Power Point Presentation, Stennis Space Center, Mississippi, AUV Bathymetry, Feb. 26-Mar. 1, 2013.

Russell, Jeff, Bourgeois, Brian, DR., and Avera, Will, UUV Positioning Using Side-Scan Features, Presented at the 2011 UUST Symposium, pp. 1-12, Aug. 21-24, 2011.

Dubberley, John, Bourgeois, Brian, Automatic Target Recognition for Improved Unmanned Underwater Vehicle Navigation Experimental Results, Presented at the International Conference on Underwater Remote Sensing, Oct. 8-11, 2012.

* cited by examiner (E) COMPUTE THE 'SNIPPET PIXEL POSITION (spp)' IN AN EARTH COORDINATE SYSTEM FOR EACH OF THE M SNIPPET PIXELS FOR EACH OF s MATCHED TARGETS, INCLUDING (1) DETERMINE FROM THE DATA LOGS THE POSITION OF THE VEHICLE IN THE EARTH COORDINATE SYSTEM AT THE SNIPPET PIXEL TIME, (2) DETERMINE FROM THE DATA LOGS THE HEADING OF THE VEHICLE IN THE EARTH COORDINATE SYSTEM AT THE SNIPPET PIXEL TIME (3) DETERMINE FROM THE DATA LOGS THE ATTITUDE (PITCH, ROLL) OF THE VEHICLE IN THE EARTH COORDINATE SYSTEM AT THE SNIPPET PIXEL TIME, (4) DETERMINE FROM THE DATA LOGS THE SNIPPET PIXEL AZIMUTH ANGLE AND DECLINATION ANGLE FROM THE VEHICLE IN THE VEHICLE COORDINATE SYSTEM AT THE SNIPPET PIXEL TIME, (5) DETERMINE FROM THE DATA LOGS THE SNIPPET PIXEL DISTANCE FROM THE VEHICLE AT THE SNIPPET PIXEL TIME, (6) COMPUTE THE SNIPPET PIXEL POSITION IN THE EARTH COORDINATE SYSTEM AT THE SNIPPET PIXEL TIME ACCORDING TO (1)-(5) 159

(F) COMPUTE THE 'SNIPPET PIXEL POSITION UNCERTAINTY (sppu)' FOR EACH OF THE SNIPPET PIXEL POSITIONS INCLUDING (1) DETERMINING FROM THE DATA LOGS THE VEHICLE POSITION UNCERTAINTY AT THE SNIPPET PIXEL TIME, (2) DETERMINING THE SNIPPET PIXEL POINTING UNCERTAINTY (spptngu) INCLUDING (a) AN ESTIMATE OF THE SNIPPET PIXEL AZIMUTH ANGLE UNCERTAINTY, (b) AN ESTIMATE OF THE SNIPPET PIXEL DECLINATION ANGLE UNCERTAINTY, (c) AN ESTIMATE OF THE SNIPPET PIXEL DISTANCE UNCERTAINTY, COMPUTING THE SNIPPET PIXEL POINTING UNCERTAINTY FROM (a) THROUGH (c) ABOVE, (4) COMPUTING THE SNIPPET PIXEL POSITION UNCERTAINTY USING THE VEHICLE POSITION UNCERTAINTY, THE SNIPPET PIXEL POINTING UNCERTAINTY AND THE PIXEL SELECTION UNCERTAINTY USING THE ROOT MEAN SQUARE OR OTHER FORMULATION 161

Ⓑ

Ⓒ

FIG. 2C (G) FOR EACH OF THE s MATCHED TARGETS, SELECT FROM THE m SNIPPET PIXELS THAT INSTANCE WITH THE LOWEST SNIPPET PIXEL POSITION UNCERTAINTY TO BE THE 'REFERENCE POSITION (rp)' FOR THAT MATCHED TARGET, THE REFERENCE POSITION HAVING A REFERENCE TIME (rt) EQUAL TO THE SNIPPET PIXEL TIME FOR THE SNIPPET PIXEL SELECTED, AND THE CHOSEN SNIPPET PIXELS OTHER THAN THE ONE SELECTED AS THE REFERENCE POSITION BEING THE REMAINING SNIPPET PIXELS (rsp) 165

(H) FOR EACH OF THE S MATCHED TARGETS, COMPUTE THE PIXEL OFFSET (po), THAT IS THE HORIZONTAL DISTANCE BETWEEN THE REFERENCE POSITION FOR THE $s^{TH}$ MATCHED TARGET AND ITS REMAINING SNIPPET PIXELS, THESE OFFSETS REPRESENTING THE ACTUAL POSITION ERROR REDUCTION THAT WILL BE ACHIEVED WITH THE POSITION FIX CREATED FROM EACH OF THE REMAINING SNIPPET PIXELS 167

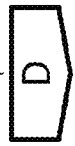

FIG. 2D (I) FOR EACH OF THE s MATCHED TARGETS, COMPUTE THE REMAINING SNIPPET PIXEL POSITION UNCERTAINTY (rsppu) FOR EACH OF THE REMAINING SNIPPET PIXELS BASED ON THE VEHICLE POSITION UNCERTAINTY AT THE REFERENCE TIME, THE REMAINING PIXEL SNIPPET PIXEL POINTING UNCERTAINTY AT ITS SNIPPET PIXEL TIME, AND THE REMAINING PIXEL PIXEL SELECTION UNCERTAINTY, AND COMPUTE THE OVERALL UNCERTAINTY USING THE ROOT MEAN SQUARED OR OTHER FORMULATION 169

(J) FOR EACH OF THE s MATCHED TARGETS, CREATE THE (m-1) VEHICLE POSITION FIXES FOR THE s^TH MATCHED TARGET USING EACH OF THE (m-1) REMAINING SNIPPET PIXELS INCLUDING (1) THE REFERENCE POSITION FOR THAT MATCHED TARGET, (2) THE REFERENCE TIME FOR THAT MATCHED TARGET, AND (3) THE REMAINING SNIPPET PIXEL POSITION UNCERTAINTY 171

(D) REPEAT STEPS (A)-(C) FOR EACH OF THE PLURALITY OF SNIPPETS 257

(E) COMPUTE A SNIPPET PIXEL POSITION IN AN EARTH COORDINATE SYSTEM AT THE SNIPPET PIXEL TIME FOR EACH OF THE SNIPPET PIXELS BASED ON THE VEHICLE POSITION IN THE EARTH COORDINATE SYSTEM AT THE SNIPPET PIXEL TIME, THE VEHICLE HEADING IN THE EARTH COORDINATE SYSTEM AT THE SNIPPET PIXEL TIME, THE VEHICLE ATTITUDE IN THE EARTH COORDINATE SYSTEM AT THE SNIPPET PIXEL TIME, THE SNIPPET PIXEL AZIMUTH ANGLE IN THE VEHICLE COORDINATE SYSTEM AT THE SNIPPET PIXEL TIME, THE SNIPPET PIXEL DECLINATION ANGLE IN THE VEHICLE COORDINATE SYSTEM AT THE SNIPPET PIXEL TIME, AND THE SNIPPET PIXEL DISTANCE FROM THE VEHICLE AT THE SNIPPET PIXEL TIME 259

(F) COMPUTE A SNIPPET PIXEL POSITION UNCERTAINTY FOR EACH OF THE SNIPPET PIXEL POSITIONS BASED ON THE VEHICLE POSITION UNCERTAINTY AT THE SNIPPET PIXEL TIME, AN ESTIMATE OF THE SNIPPET PIXEL AZIMUTH ANGLE UNCERTAINTY, AN ESTIMATE OF THE SNIPPET PIXEL DECLINATION ANGLE UNCERTAINTY, AN ESTIMATE OF THE SNIPPET PIXEL DISTANCE UNCERTAINTY, AND THE PIXEL SELECTION UNCERTAINTY 261

(G) SELECT A REFERENCE POSITION AND A REFERENCE TIME BASED ON THE SNIPPET PIXEL POSITION UNCERTAINTIES AND THE SNIPPET PIXEL TIMES 263

(H) DETERMINE REMAINING SNIPPET PIXELS BASED ON THE REFERENCE POSITION, THE REMAINING SNIPPET PIXELS EACH HAVING A REMAINING PIXEL'S PIXEL SELECTION UNCERTAINTY AND A REMAINING PIXEL SNIPPET PIXEL POINTING UNCERTAINTY AT THE SNIPPET PIXEL TIME 265

FIG. 3C

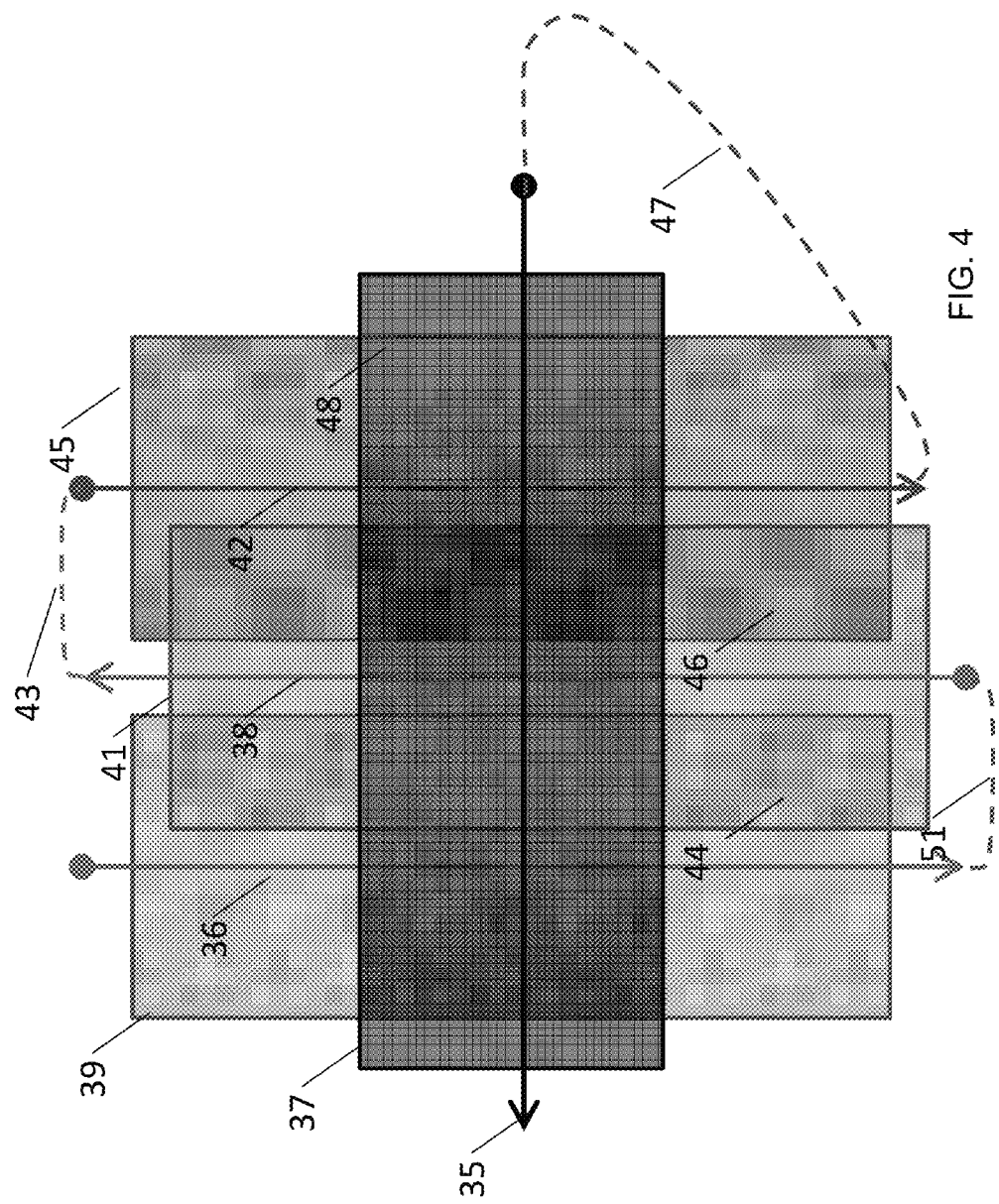

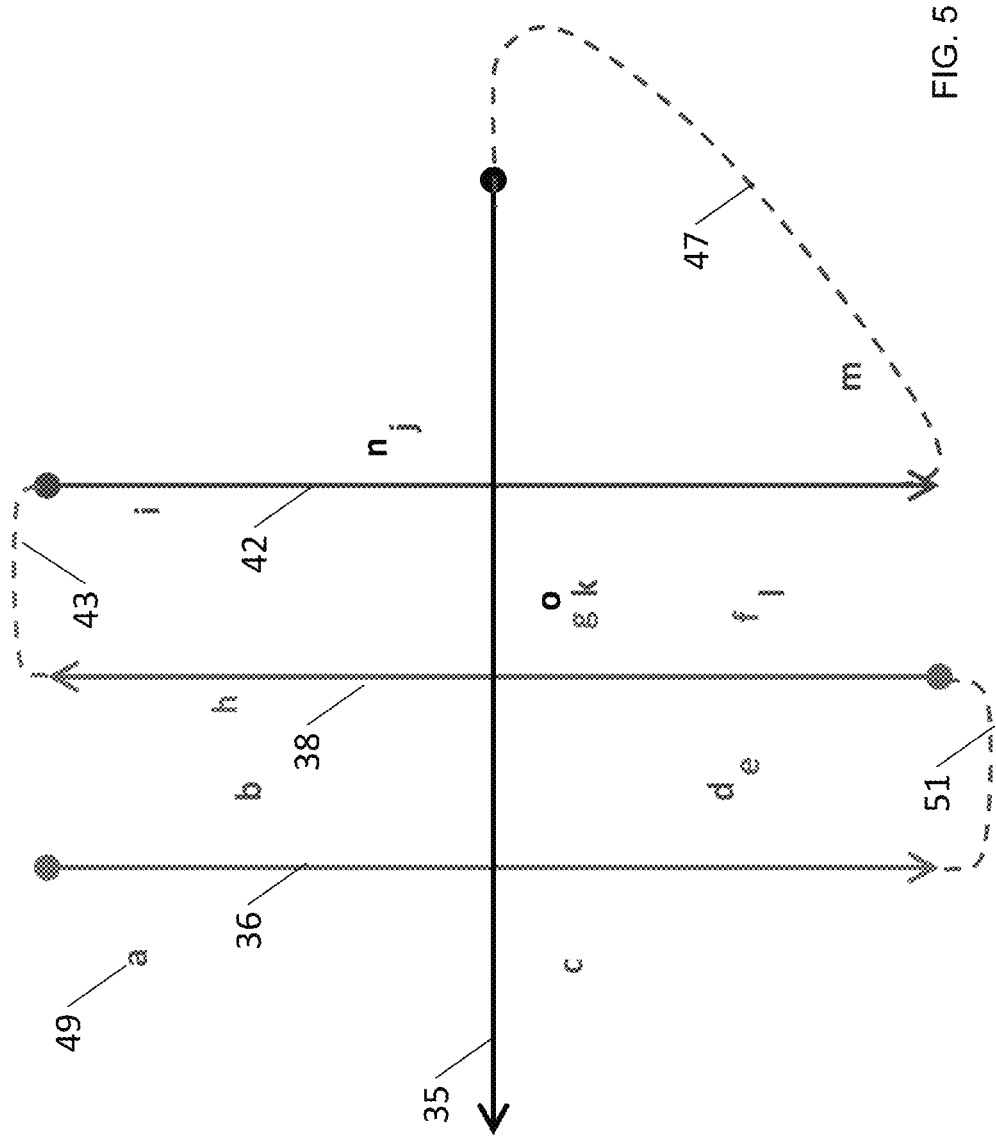

SYSTEM AND METHOD FOR AUTOMATED BOTTOM FEATURE NAVIGATOR

CROSS-REFERENCE TO RELATED APPLICATIONS

This application is a non-provisional application claiming priority to provisional application 61/776,258 filed on Mar. 11, 2013, entitled SYSTEM AND METHOD FOR AUTOMATED BOTTOM FEATURE NAVIGATOR under 35 USC 119(e). The entire disclosure of the provisional application is incorporated herein by reference.

BACKGROUND

Methods and systems disclosed herein relate generally to enable long endurance Unmanned Underwater Vehicle (UUV) missions by providing the ability to use seafloor features of opportunity as 'landmarks' to reduce/constrain position error growth by providing relative position fix accuracies on the order of one meter.

Currently, underwater acoustic systems (Ultra-Short Base Line, Long Base Line, Beacons, U/W GPS, etc.) are expensive/prohibitive to deploy and limit the geographic area of travel of the UUV. Surfacing for GPS fix is hazardous and ineffective for deep water missions. Inertial and Doppler Velocity Log (DVL) navigation (dead-reckoning) is standard practice for high-grade UUVs, but has unbounded position error that grows with time. Multibeam (bathymetry) sonars have inadequate resolution to achieve the 1 m goal. Imaging sonars (Sidescan, Synthetic Aperture) have superior spatial resolution compared to other acoustic systems but historically have inadequate pixel position accuracy relative to vehicle. Standard optical image processing approaches are ineffective because spatial resolution is too poor, there is an insufficient number of pixels on small targets, the high grazing angle results in pixel size distortion with range (on the order of 20:1), and there is high noise due to the environment. Fully automated approaches for finding targets remain unsuccessful (missed targets, high false detect). Manual approaches are untenable (tedious, manual reviewing of imagery can take as long as the mission). Thus, all existing positioning methods are inadequate for long endurance submerged unmanned underwater vehicle missions.

The position error growth while dead-reckoning can be constrained by using detected targets along the vehicle's path. For example, if a vehicle sees a target at time t1 and the position error at that time is e1, when the vehicle sees the same target later at time t2 it will appear to be in a different position due to the accumulated vehicle position error. The vehicle's position can be adjusted to account for this difference and its position error set back to e1, the position error at the first sighting. While this concept of constraining position error is not new, the ability to accomplish it with acceptable accuracy using underwater sensors has not been done previously. It is a difficult problem to create vehicle position updates using seafloor objects (referred to herein interchangeably as 'targets') that may be seen, as few as only two times during a mission. The techniques can be applied to simpler situations where a target is seen many times during the same mission, and to the creation of a target database that can be used for position correction in subsequent missions.

To identify suitable targets, multibeam sonar systems have high position accuracy, but their spatial resolution is far too poor for doing bottom feature position estimates except with very large targets and thus yield inadequate position accuracy. What is needed is to be able to identify suitable targets using acoustic imagery systems (traditional sidescan, Synthetic Aperture Sonar) which are presently the only existing technologies suitable for the purpose of this invention. However, even though sidescan sonar technology has advanced considerably in the last two decades, it still lacks sufficient resolution. A suitable target may only have a few pixels on it. Additionally, it typically has significant pixel distortion with range (as much as 20:1) due to typically low grazing angles and often has high levels of noise due to the environment. Consequently, target identification methods used commonly with optical systems (that do not suffer these problems) to analyze the 'image' of a target cannot be readily used on acoustic imagery. The imagery can be scanned manually for targets, but this process is tedious and can take longer than the mission itself. Methods that address this problem through scene recognition (using many points within an image for position registration) are a topic of current research and do not yet work with sidescan imagery. What is needed is to combine target identification that relies on the use of small, isolated targets for initial detection and subsequent redetection with further new technology developments to reduce UUV fix position inaccuracies.

Historically, sidescan sonars were developed to be inexpensive systems that were towed behind a host vehicle, used merely to visually identify areas or objects of interest. Consequently, the imagery created had inherently poor position information and the desired pixel positioning accuracy (one meter with overall system error less than ten meters) could not be achieved. To overcome this deficiency, a tight and very precise coupling of a sidescan sonar with vessel high-quality navigation sensors can achieve improvements in pixel position accuracy. Improvements to achieve the coupling include, but are not limited to, time synchronization between the sonar and position/attitude measurement sensors, logging of the necessary data at a sufficient rate and resolution, data post-processing to apply linear and angular offsets, accounting for sonar height above the seafloor, and using sufficient numeric resolution.

What is needed is to enable long endurance UUV missions by providing the ability to use seafloor features of opportunity as 'landmarks' to reduce/constrain position error growth. A goal is to achieve relative position fix accuracies on the order of one meter.

SUMMARY

The system and method of the present embodiment reduce UUV position uncertainty using objects that are detected by the vehicles' acoustic imagery sensors more than one instance in time. These objects are used to constrain vehicle position uncertainty growth, enabling the vehicle to conduct extended submerged survey operations whilst maintaining acceptable position uncertainty. The UUV optimally has a navigation system on the order of that typically used for hydrographic surveying that can measure the position of objects detected in the imagery with respect to the vehicle with an uncertainty on the order of one meter. Seafloor objects that can be used as targets for the purpose of positioning can be stationary, recognizable as the same objects despite different distances & aspects from the vehicle that result in object distortion in the imagery, and in substantially low clutter areas, to reduce the possibility of declaring different objects in the vicinity as the same object.

In essence, the object serves as a landmark with which the vehicle corrects its position when it sees it on subsequent passes. The system and method of the present embodiment dramatically reduce the amount of data that needs to be analyzed by culling out unusable areas, excluding areas where insufficient overlap exists between data swaths in the same geographic area, excluding areas where high clutter prohibits target identification, combining automatic and manual approaches that leverage the strengths of each, coupling of the sonar's imagery and vehicles navigation system information, computing position fix error estimates suitable for ingestion by Kalman-based navigation systems, guaranteeing position error reduction using a target's occurrence with the lowest position error as the reference, and recursively applying seafloor target fixes to reduce position error.

The position uncertainty of a UUV that is dead reckoning, typically using a navigation suite consisting of an inertial sensor and a Doppler Velocity Log (DVL), can grow linearly with the distance travelled between external position fixes. External fixes can be obtained using GPS, Ultra-Short Baseline (USBL), Long Baseline (LBL) and other similar methods that provide position estimations relative to points with known position. The consequence of the vehicles' navigation systems' actual position error growth with distance travelled between external fixes is that the same object sighted at different times will 'appear' to be in different geographic locations. The actual error may not be known without a position fix to compare to, but estimates of the position uncertainty growth based on system performance specifications and field calibration of the system can be made. The system and method of the present embodiment make use of the fact that given multiple 'sightings' of the same stationary seafloor object, one can be selected as a reference sighting, the time instance of that object having the lowest estimated position uncertainty as computed by the vessel's navigation system. The x,y offset as perceived by the vehicle of all other sightings of the same object from the position of the reference sighting can be measured, and the offset can be used to determine a new position of the vehicle at the times of those other sightings. Taking into account the additional effects of pointing angle errors and pixel selection errors, an updated and reduced position uncertainty at these other sighting times can also be computed. The resulting new positions and their respective uncertainties can then be incorporated post-mission by the vehicle's navigation processing suite as 'new' external position fixes, guaranteeing a reduction in vehicle position error throughout the mission.

In the system and method of the present embodiment, not all of the mission data need be searched for targets. The method of the present embodiment for computing an error for each position fix can include, but is not limited to including automatically detecting targets, automatically determining geographic matches between the detected targets and known targets, determining if the geographic matches are the same target, automatically creating image snippets for each instance of potential target positions, selecting a single point on each of the image snippets, and a precise estimate of the position offset of the target pixel from the vehicle's estimated position, estimating the position offset of the designed target pixel based on heading, pitch, roll, altitude, sonar mounting angle, sonar beam width, linear offsets between sonar and navigation system, and sound speed, assigning a position error to each designated target based on the UUV's navigation system generated position error estimate corresponding to the exact mission time of the image pixel declared a target, an estimation of the error of the position offset of the target pixel from the vehicle's estimated position, utilizing a propagation of errors approach and/or calibration test results, and an error contribution estimate based on the size of the designated target, integrating, based on the position error estimate, the position fixes being created using the vessel's Kalman-based navigation post-processing system, for each unique target, the time instance with the lowest total error is chosen as the reference position: $\forall t = (t_1, t_2 \ldots t_n)$ for a target, $t_{ref} = t_i \ni P_e(t_i) = \min(P_e(t))$, creating fixes for each additional time instance of the same target, assigning a reference position to each of those time instances: $P(t_1 \ldots t_n) = P(t_{ref})$, computing the error for each fix based on the L2 norm (root mean square) of the reference position error and the error of the position offset of the target pixel from the vehicles estimated position (pointing error) at each fix time.

Created position fixes are applied using the vehicle's navigation post-processing system (a procedure known as 'renavigation') which applies a vehicle position reset at the time of the fix, and smooths the mission's position data using a Kalman filter to 'distribute' the fix forward and backward in time. The position fixes can be applied recursively for optimal error reduction. The target that yields the greatest reduction in position error for the first set of position fixes can be optimally used. Application of these fixes can alter the positions at all other mission times after smoothing, motivating the recomputation of the position fixes for the remaining targets. This process can be repeated until a threshold is reached for the reduction in error. Alternatively, all fixes can be applied simultaneously for a quicker position update. Tests have shown that the UUV's position error is reduced to less than 10 m using the system and method of the present embodiment.

The computer-based method of the present embodiment for generating vehicle position fixes of a vehicle having a vehicle position, a vehicle heading, a vehicle attitude, a vehicle coordinate system, and a vehicle position uncertainty, can include, but is not limited to including, (a) selecting a snippet pixel from each of a plurality of image snippets, the plurality of image snippets being associated with a target, the target having a target position, each of the snippet pixels being associated with an estimated target position, a snippet pixel time, and a target size of the target, each of the snippet pixels having a snippet pixel azimuth angle, a snippet pixel azimuth angle uncertainty, a snippet pixel declination angle, a snippet pixel declination angle uncertainty, a snippet pixel distance from the vehicle, and a snippet pixel distance uncertainty, (b) measuring each of the target sizes, (c) computing a pixel selection uncertainty for the snippet pixel based on the measured target size, (d) repeating steps (a)-(c) for each of the plurality of snippets, (e) computing a snippet pixel position in an earth coordinate system at the snippet pixel time for each of the snippet pixels based on the vehicle position in the earth coordinate system at the snippet pixel time, the vehicle heading in the earth coordinate system at the snippet pixel time, the vehicle attitude in the earth coordinate system at the snippet pixel time, the snippet pixel azimuth angle in the vehicle coordinate system at the snippet pixel time, the snippet pixel declination angle in the vehicle coordinate system at the snippet pixel time, and the snippet pixel distance from the vehicle at the snippet pixel time, (f) computing a snippet pixel position uncertainty for each of the snippet pixel positions based on the vehicle position uncertainty at the snippet pixel time, an estimate of the snippet pixel azimuth angle uncertainty, an estimate of the snippet pixel declination angle uncertainty, an estimate of the snippet pixel distance uncertainty, and the pixel selection uncertainty, (g) selecting a reference position and a reference time based on the snippet pixel position uncertainties and the snippet pixel times, (h) determining remaining snippet pixels based on the reference position, the remaining snippet pixels each having a remaining pixel's pixel selection uncertainty and a remaining pixel snippet pixel pointing uncertainty at the snippet pixel time, (i) computing a pixel offset based on the reference position and the remaining snippet pixels, (j) computing a remaining snippet pixel position uncertainty for each of the remaining snippet pixels based on the vehicle position uncertainty at the snippet pixel time of the reference position, the remaining pixel snippet pixel pointing uncertainty, and the remaining pixel selection uncertainty, and (k) creating the vehicle position fixes for the target based on the remaining snippet pixels, the reference position, the snippet pixel times, and the remaining snippet pixel position uncertainties.

Optionally, the method can include selecting a plurality of the targets, and repeating steps (a) through (k) for each of the plurality of targets. The method can further optionally include determining the vehicle position, the vehicle heading, the vehicle attitude, the snippet pixel azimuth angle, the snippet pixel declination angle, and the snippet pixel distance from the vehicle from data logs. The method can still further optionally include computing the snippet pixel pointing uncertainty based on an estimate of the snippet pixel azimuth angle uncertainty, an estimate of the snippet pixel declination angle uncertainty, an estimate of the snippet pixel distance uncertainty, and computing the snippet pixel position uncertainty based on a root mean square of the vehicle position uncertainty at the snippet pixel time, the snippet pixel pointing uncertainty, and the pixel selection uncertainty. The method can even still further optionally include determining a lowest of the snippet pixel position uncertainties, and identifying the snippet pixel associated with the lowest of the snippet pixel position uncertainties as the reference position, the reference position having the reference time equal to the snippet pixel time for the identified snippet pixel. The method can also include computing the pixel offset as a horizontal distance between the reference position and the remaining snippet pixels, computing the uncertainty using root mean square based on the vehicle position uncertainties at the snippet pixel time of the reference position, the remaining pixel snippet pixel pointing uncertainties, and the remaining pixel's pixel selection uncertainties, computing a remaining snippet pixel uncertainty based on a root mean square of the vehicle position uncertainty at the reference time, the remaining pixel snippet pixel pointing uncertainty, and the remaining pixel's pixel selection uncertainty, and for each of the plurality of targets, applying the vehicle position fixes for each of the remaining snippet pixels. The method can still further include, (l) for all of the plurality of targets, determining the target having a largest pixel offset for the remaining snippet pixels associated with the target, (m) applying the vehicle position fixes associated with the determined target, (n) recomputing the vehicle position fixes for the targets except the determined target, and (o) repeating steps (l)-(n) until a maximum of the pixel offsets is less than a pre-selected threshold.

In an alternative embodiment, a method for reducing the search space to areas with sufficient data overlap and minimal clutter can include automated preprocessing of the sidescan data

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-2E are flowcharts of an embodiment of the method of the present teachings;

FIGS. 3A-3D are flowcharts of the method of another embodiment of the method of the present teachings;

FIG. 4 is a graphical representation of a conceptual survey pattern traversed by an underwater vehicle;

FIG. 5 is a graphical depiction of the conceptual survey pattern of FIG. 4 indicating a time-ordered list of bottom objects—a, b, c, d, e, f, g, h, i, j, k, l, m, n, o—detected in, for example, acoustic imagery;

DETAILED DESCRIPTION

The problems set forth above as well as further and other problems are solved by the present teachings. These solutions and other advantages are achieved by the various embodiments of the teachings described herein below.

Figure 1:
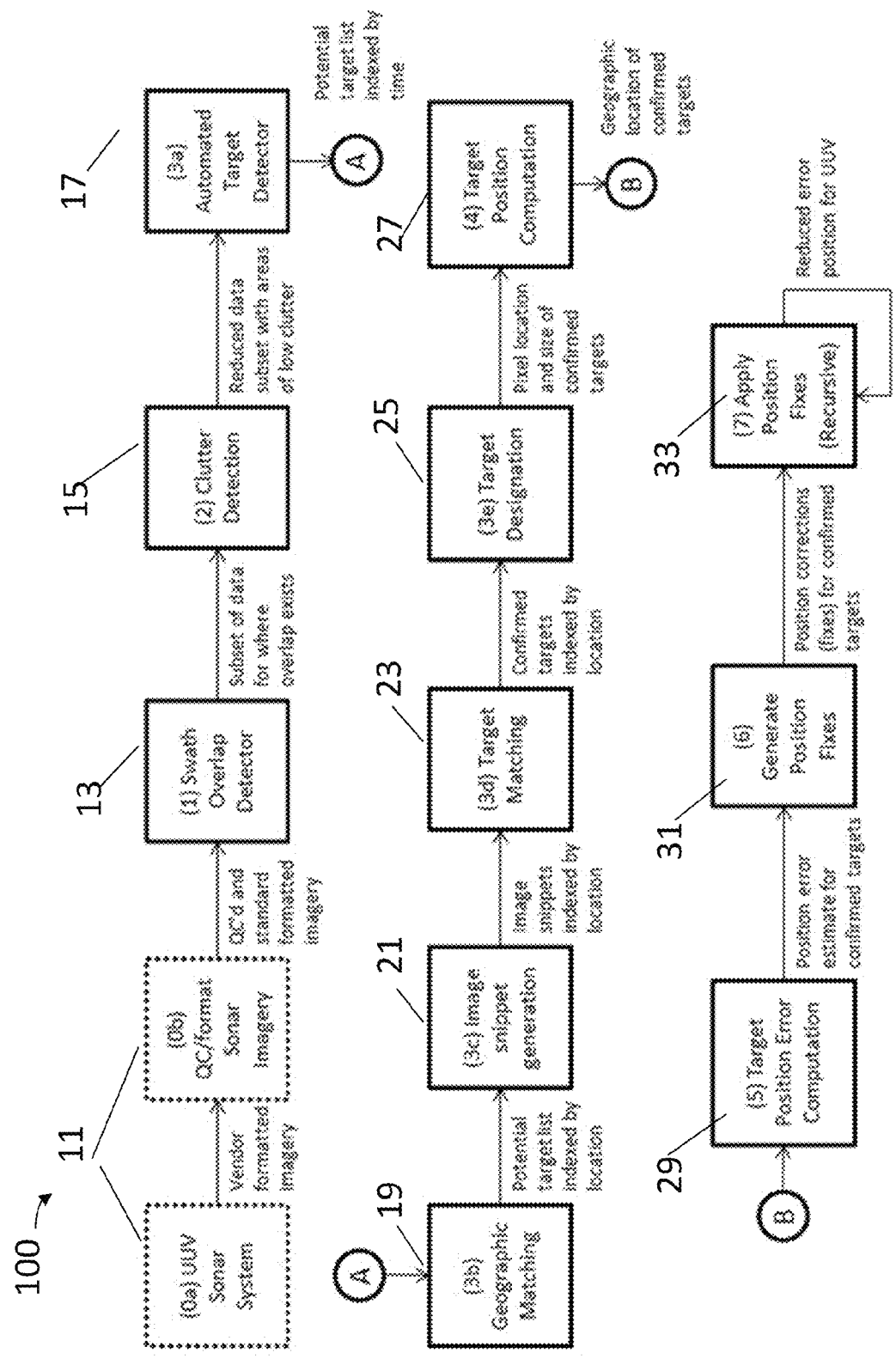
FIG. 1 is a schematic block diagram of an embodiment of the system and method of the present teachings.
Figure 2A:
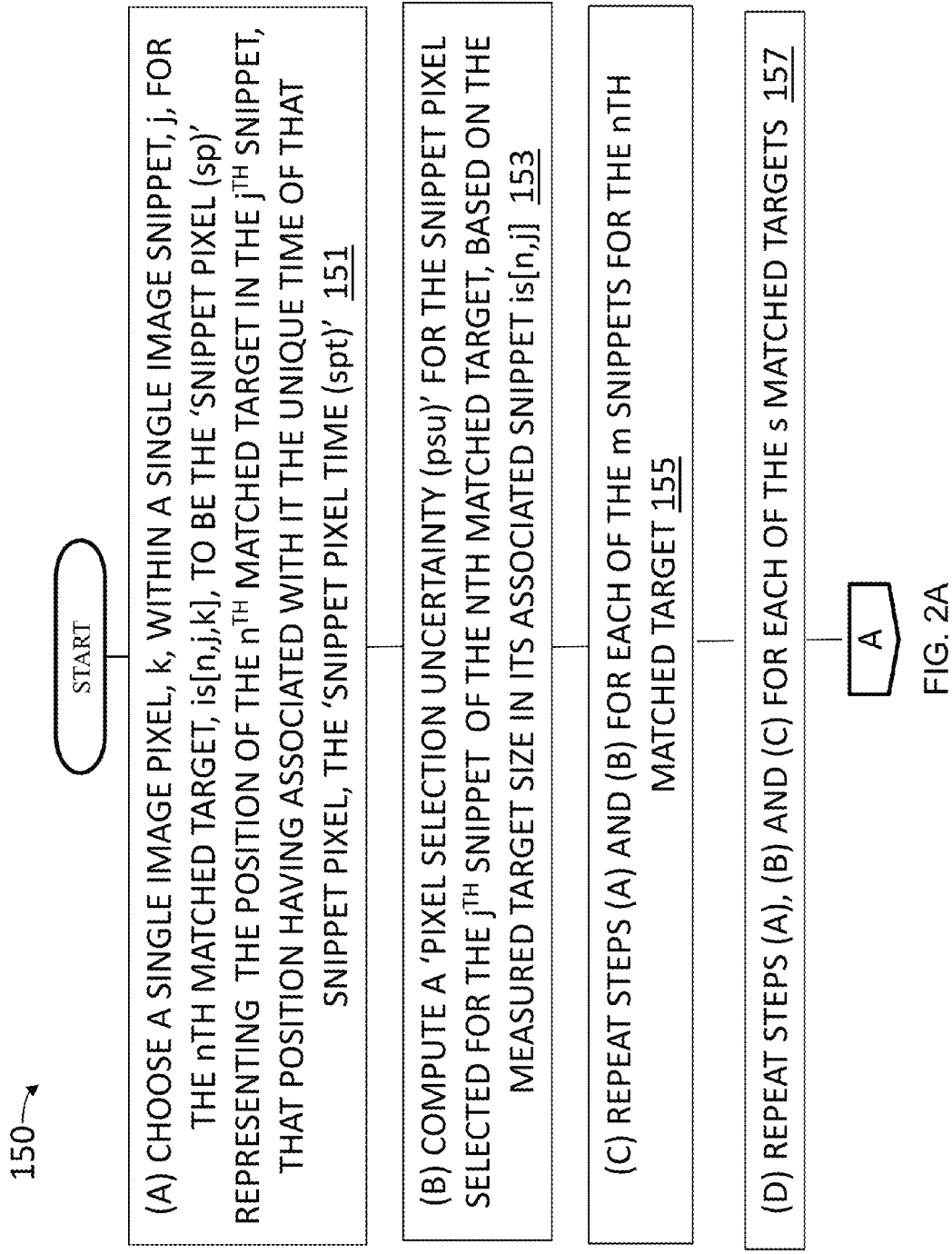
Figure 3A:
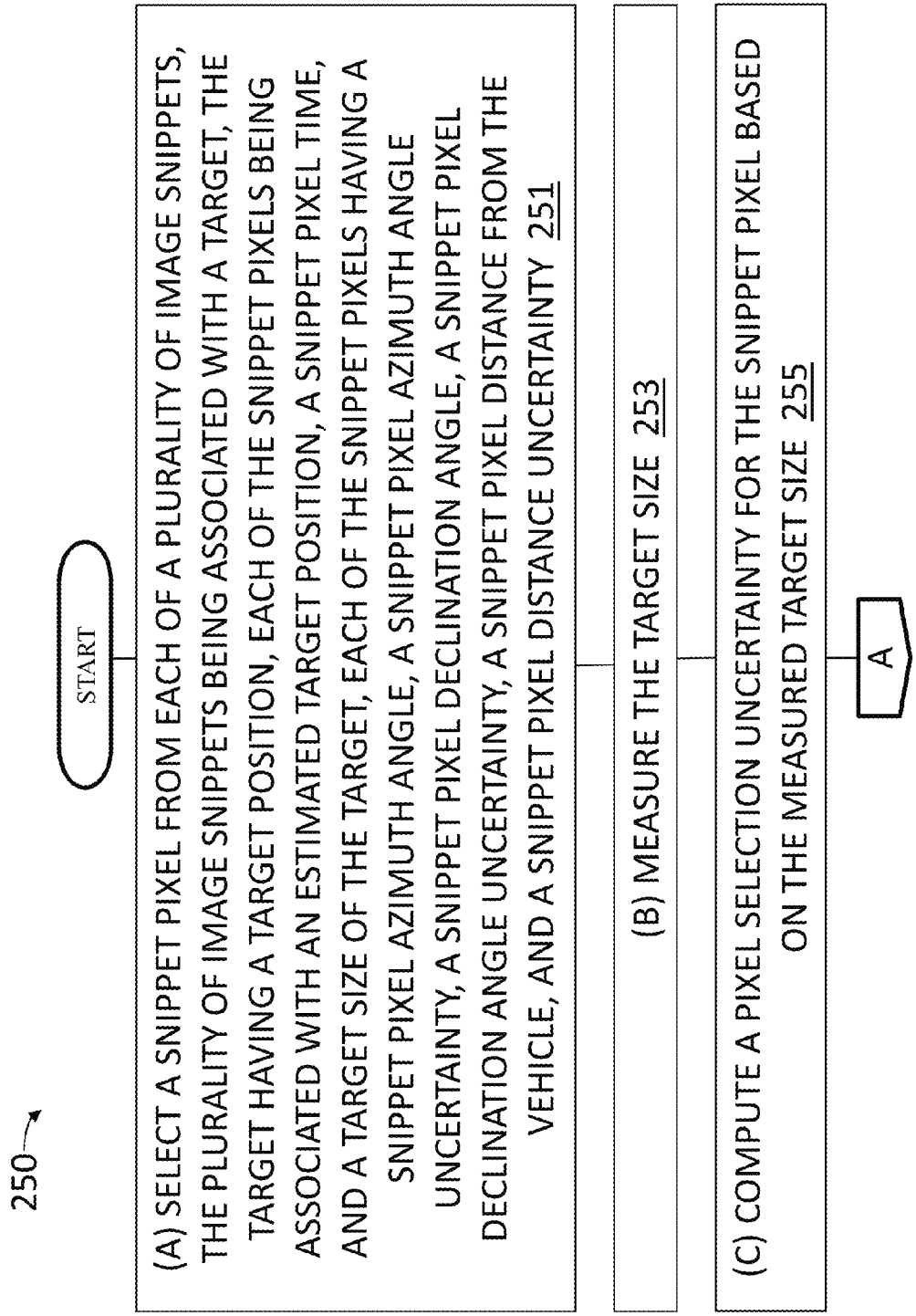
Figure 3D:
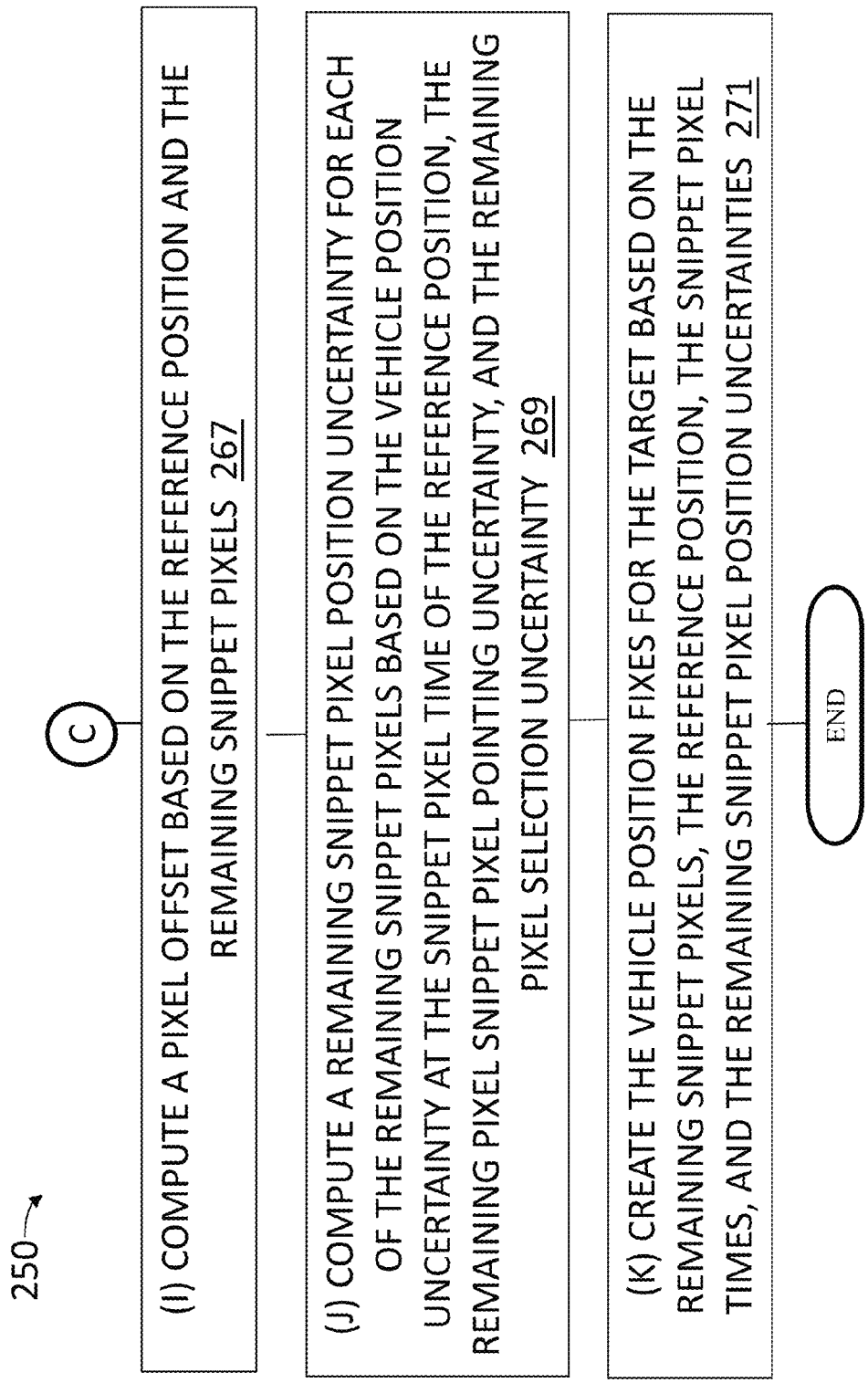

Referring now to FIG. 1, Modules (0a) and (0b) 11 are associated with the specific sonar and its data processing suite. Module (0a) is the sonar system mounted on the Unmanned Underwater vehicle. It outputs the acoustic imagery in a vendor specific format. Module (0b) is used to perform quality control on the image data and to reformat it into a non-vendor specific format such as, for example, but not limited to, UNISIPS, a standard for acoustic imagery.

Continuing to refer to FIG. 1, Modules (1) 13 and (2) 15 are culling steps, reducing the amount of data that has to be analyzed. Sidescan data is large in volume, and its analysis post-mission can take as long as the mission itself. Instances of culling approaches include swath overlap detection (for example, United States Patent Publication #2013/0218543, published Aug. 22, 2013), and clutter detection (for example, U.S. Pat. No. 7,990,804, Automated Change Detection and Classification-Real-Time (ACDC-RT) System, issued on Aug. 2, 2011 (804), incorporated herein in their entirety by reference). The swath overlap detector examines the imagery and defines a subset of the imagery where there is sufficient (for example, a user specified parameter) overlap of geographic areas (i.e. of the imagery swaths at different times) to look for potential targets that can be used to generate fixes. Depending upon the design of the survey tracks, Module (1) 13 can dramatically reduce the amount of imagery that needs to be analyzed. Module (2) 15 can examine the imagery data in the overlap regions and can locate areas where there is low clutter to look for potential targets. High clutter areas can be a challenge for target detection methods. Module (2) 15 can reduce the amount of imagery that needs to be analyzed by eliminating the areas that can result in high false alarm rates.

Continuing to still further refer to FIG. 1, Modules (3a-e) 17-25 create a list of usable targets in the imagery. Module (3a) 17 is an automated target detector that can examine the imagery and identify potential targets. Module (3a) 17 can generate a time ordered list of potential targets, recording the mission time when they were 'seen' and their approximate position (see, e.g., '804). Module (3b) 19 can perform geographic matching. For every location of a potential target flagged by Module (3a) 17, Module (3b) 19 finds all other occurrences of the same location in the data and creates an position ordered list of potential targets, where at a given position there may be several instances in the imagery data at different times, depending on how many times the UUV flew over the same area in the mission. By doing geographic matching, potential targets can be found that may have been missed by the automated target detector.

Continuing to even still further refer to FIG. 1, Module (3c) 21 can create, from a position ordered list of potential targets, an image snippet, i.e. a small image around the specified location, for subsequent inspection. The size of the snippet must be large enough to account for the estimated vehicle position error at the time of the potential target observation. This is because the target will not appear to be in the same location since the vehicle has different position error at different mission times.

Continuing to refer to FIG. 1, Module (3d) 23, object matching, can be accomplished with automated software or manually. Object matching is the process by which objects seen on the seafloor at different mission times are declared to be the same object, and thus a valid 'target' for vessel position correction. Automated approaches of object matching in acoustic imagery in combination with manual methods can achieve the strengths of both. Automated geographic matching and snippet generation can aid in finding instances of bottom targets that were missed by both manual and automated detection. Module (3d) 23 can use the image snippets generated by module (3c) 21 and, for each potential target location, Module (3d) 23 can use manual or automated methods to examine the images at each mission time in the same location to determine if the target is seen in each snippet. If the same target is seen at least two times, then it is declared a confirmed target. Module (3d) 23 can output a position ordered list of confirmed targets and all time instances for which they were observed.

Again referring to FIG. 1, Modules (3e) 25, (target designation), (4) 27 (target position computation), (5) 29 (target position error computation) and 6 (generate position fixes) can be described as follows. With respect to Module (3e) 25, for each group of image snippets (two or more) for the same target, a pixel on each instance of the target is chosen as the point to use to determine the location of the target, and the size of the target in the image is measured. These steps are taken for each set of confirmed targets. Module (3e) 25 designates the exact pixel that will be considered to be the position of each sighting of the target. The goal is to designate the same position on the target for each sighting, but due to pixel size distortion and other image quality issues this is often not possible. The measured extent of the target provides a measure of the possible position error incurred by the selection of a specific pixel as the target's position. The larger the target, the greater the potential position error due to the selection of a specific pixel as its location. Module (3e) 25 can be either a manual or automated process and can provide the specific pixel that is considered to be the position of each confirmed target at each time instance sighted.

Still further referring to FIG. 1, Module (4) 27, target position computation, a conventionally available process, can determine the geographic position of each time instance for each confirmed target in the matched set using the vehicle position and the pointing angle and distance from the vehicle to the pixel chosen as the target's position in the image. Module (4) 27 can compute the geographic position using the designated pixels. Module (4) 27 can determine an estimated position (latitude, longitude, depth) of the UUV at the time of a target sighting and can then determine the pixel's precise location. The image position reference frame can be translated to the sensor position reference frame and then to the vehicle's position reference frame to obtain a geographic position estimate for the pixel. These computations are based on vessel heading, vessel pitch, vehicle roll, sonar mounting angle and linear offsets relative to the vehicles vertical reference and/or inertial system, and sound speed. The ability to properly perform these computations depends on the proper and precise time tagging for all of the relevant data logged and the accurate measurement and/or calibration of the sonar mounting relative to the vehicles navigation system. Module (4) 27 can provide the position estimate of the designated targets at each time instance that they were sighted.

With further reference to FIG. 1, Module (5) 29, target position error computation, can determine, for each confirmed target, an estimate of the uncertainty of the position computed for each time instance of that target of the confirmed targets based on the vehicle position uncertainty, the pointing angle and distance uncertainty from the vehicle to the pixel chosen as the target's position in the image, and the position uncertainty resulting from the choice of a specific pixel on the target in each time instance. Prior art does not include a position error estimate component to account for the specific pixel chosen on a time instance of a target. Errors can be the result of the vehicle navigation system, either measured or estimated by calibration errors in the translation from the sensor reference frame to the vehicle reference frame, and errors incurred in translation from the image reference frame (time resolution, pixel size distortion as a function of range, etc.) to the sensor reference frame. The output of Module (5) 29 is an estimate of the position error for each position of the confirmed targets at each time instance that were produced by Module (4) 27. The error estimate is required for a position fix to be optimally integrated using a Kalman filter in a UUV's post-processing software. Module (5) 29 constructs a unique error estimate for each instance of the same target, using the L2 norm:

$$E(t_i) = \sqrt{V_e(t_i)^2 + P_e(t_i)^2 + T_e(t_i)^2},$$

where ($V_e$) is a vessel position uncertainty (from its navigation system) at time of the target, $t_i$;

($P_e$) is a pointing error from the sonar to the target's pixel; and ($T_e$) accounts for error incurred due to selecting a different spot on the target for each instance, as a consequence of target size and pixel distortion.

Continuing to reference FIG. 1, Module (6) 31, position fix generator, uses the positions and position errors for each designated target to create the actual position 'fixes' that will be used to reduce the UUVs position error. Module (6) 31, for each confirmed target, selects the time instance which has the lowest position uncertainty as the reference location for that target, computes the position fix for each remaining instance in the set of confirmed targets that are geographically matched (the matched set) using the location of the UUV at the mission time of the reference location, and the x,y position offset between the target at the reference location and the target at each remaining instance, and computes the position uncertainty for each remaining instance in the matched set using the UUV position uncertainty at the mission time of the reference location, but using the pointing uncertainty and pixel selection uncertainty for the mission time of the remaining instance. Prior art systems do not use time instance pointing and pixel errors to compute the position fix uncertainty. Mathematically, this can be expressed as: $\forall t=(t_1, t_2 \ldots t_n)$ for a target, $t_{ref}=t_i \ni E(t_i)=\min(E(t))$. Fixes are created for each additional time instance of the same target. The reference position is assigned to each of those time instances: $P(t_i \ldots t_n)=P(t_{ref})$, where $P(t_i)$ and $P_e(t_i)$ are the position and position error respectively of the designated targets at time instance i. The fix error for each additional time instance is computed as $$F_e(t_i) = \sqrt{V_e(t_{ref})^2 + P_e(t_i)^2 T_e(t_i)^2}$$

where $V_e$ is the vehicle position error at the reference time, $P_e$ is the pointing error at the time of the additional instance, and $T_e$ is the target selection error at the time of the additional instance.

Finally, with reference to FIG. 1, Module (7) 33 applies the position fixes created for each of the targets in Module (6) 31 to the UUV's mission position data to reduce the UUV position error. As the application of a single position fix changes the position of the UUV throughout its data set, the application of position fixes can be done recursively to improve the overall error reduction by repeating Module (4) 27 through Module (6) 31 after each position fix is applied. Prior art systems do not recursively apply fixes to further reduce error. Module (7) 33 uses the vehicle navigation post-processing suite to integrate the fixes and regenerate vehicle positions at all mission times. As the fixes created by Module (6) 31 are 'relative' fixes, i.e. position adjustments based on multiple sightings of the same target versus actual position estimates using a bona fide position system, they can be applied recursively by doing repeated runs through the post-processing suite until no further reduction (based on, for example, but not limited to, an operator specified threshold) in position error occurs. Ideally, post-processing on each fix would be run independently, starting with the fix that has the greatest reduction in position error (difference in position error between the reference time and the fix time) and then repeat the application of Module (6) 31 and Module (7) 33 on the remaining targets. Alternatively, all fixes could be applied simultaneously in one run if it is necessary to reduce processing time.

Referring now to FIGS. 2A-2E, method 150 of the present embodiment for generating vehicle position fixes given (s) matched targets, MT=1, 2, . . . s, each having a plurality of image snippets IS[MT,m,p] associated with each of these matched targets, where m is the number of image snippets associated with each matched target and p is the number of pixels contained in each of the m image snippets, can include, but is not limited to including (a) choosing 151 (FIG. 2A) a single image pixel, k, within a single image snippet, j, for the nth matched target, IS[n,j,k], to be the 'snippet pixel (SP)' representing the position of the $n^{th}$ matched target in the $j^{th}$ snippet, that position having associated with it the unique time of that snippet pixel, the 'snippet pixel time (SPT)', (b) computing 153 (FIG. 2A) a 'pixel selection uncertainty (PSU)' for the snippet pixel selected for the $j^{th}$ snippet of the nth matched target, based on the measured target size in its associated snippet IS[n,j], and (c) 155 (FIG. 2A) repeating steps (a) and (b) for each of the m snippets for the nth matched target. The method can also include (d) repeating 157 (FIG. 2A) steps (a), (b) and (c) for each of the s matched targets, (e) computing 159 (FIG. 2B) the 'snippet pixel position (SPP)' in an earth coordinate system for each of the m snippet pixels for each of s matched targets, including (1) determining from the data logs the position of the vehicle in the earth coordinate system at the snippet pixel time, (2) determining from the data logs the heading of the vehicle in the earth coordinate system at the snippet pixel time (3) determining from the data logs the attitude (pitch, roll) of the vehicle in the earth coordinate system at the snippet pixel time, (4) determining from the data logs the snippet pixel's azimuth angle and declination angle from the vehicle in the vehicle's coordinate system at the snippet pixel time, (5) determining from the data logs the snippet pixel's distance from the vehicle at the snippet pixel time, (6) computing the snippet pixel's position in the earth coordinate system at the snippet pixel time using 1-5 above. Method 150 can also include (f) computing 161 (FIG. 2C) the 'snippet pixel position uncertainty (SPPU)' for each of the snippet pixel positions including (1) determining from the data logs the vehicle position uncertainty at the snippet pixel time, (2) determining the snippet pixel pointing uncertainty (SPPtngU) including (A) an estimate of the snippet pixel's azimuth angle uncertainty, (B) an estimate of the snippet pixel's declination angle uncertainty, (C) an estimate of the snippet pixel's distance uncertainty, (3) computing the snippet pixel pointing uncertainty from (A) through (C) above, (4) computing the snippet pixel position uncertainty using the vehicle position uncertainty, the snippet pixel pointing uncertainty and the pixel selection uncertainty using the root mean square or other formulation. Method 150 can also include (g) for each of the s matched targets, selecting 165 (FIG. 2D) from the m snippet pixels that instance with the lowest snippet pixel position uncertainty to be the 'reference position (RP)' for that matched target, the reference position having a reference time (RT) equal to the snippet pixel time for the snippet pixel selected, and the chosen snippet pixels other than the one selected as the reference position being the remaining snippet pixels (RSP), (h) for each of the s matched targets, computing 167 (FIG. 2D) the pixel offset (PO), that is the horizontal distance between the reference position for the $s^{th}$ matched target and its remaining snippet pixels, these offsets representing the actual position error reduction that will be achieved with the position fix created from each of the remaining snippet pixels, (i) for each of the s matched targets, computing 169 (FIG. 2E) the remaining snippet pixel position uncertainty (RSPPU) for each of the remaining snippet pixels based on the vehicle position uncertainty at the reference time, the remaining pixel's snippet pixel pointing uncertainty at its snippet pixel time, and the remaining pixel's pixel selection uncertainty, and computing the uncertainty using the root mean squared or other formulation, (j) for each of the s matched targets, creating 171 (FIG. 2E) the (m−1) vehicle position fixes for the $s^{th}$ matched target using each of the (m−1) remaining snippet pixels including (1) the reference position for that matched target, (2) the reference time for that matched target, and (3) the remaining snippet pixel position uncertainty. Method 150 can optionally include applying the vehicle position fixes for each of the (m−1) remaining snippet pixels for each of the s matched targets. Method 150 can further optionally include (t) for all of the s matched targets, determine the matched target, q, that has the greatest pixel offset for its (m−1) remaining snippet pixels, (u) apply the vehicle position fixes associated only with the qth matched target that has the remaining snippet pixel with the greatest pixel offset, (v) recompute the position fixes for the remaining (s−1) matched targets, and (w) repeat steps (t) through (v) until the maximum of the pixel offset falls below a pre-selected threshold.

Referring now to FIGS. 3A-3D, alternate method 250 of the present embodiment for generating vehicle position fixes of a vehicle having a vehicle position, a vehicle heading, a vehicle attitude, a vehicle coordinate system, and a vehicle position uncertainty, (a) selecting 251 a snippet pixel from each of a plurality of image snippets, the plurality of image snippets being associated with a target, the target having a target position, each of the snippet pixels being associated with an estimated target position, a snippet pixel time, and a target size of the target, each of the snippet pixels having a snippet pixel azimuth angle, a snippet pixel azimuth angle uncertainty, a snippet pixel declination angle, a snippet pixel declination angle uncertainty, a snippet pixel distance from the vehicle, and a snippet pixel distance uncertainty, (b) measuring 253 the target size, (c) computing 255 a pixel selection uncertainty for the snippet pixel based on the measured target size, (d) repeating 257 steps (a)-(c) for each of the plurality of snippets, (e) computing 259 a snippet pixel position in an earth coordinate system at the snippet pixel time for each of the snippet pixels based on the vehicle position in the earth coordinate system at the snippet pixel time, the vehicle heading in the earth coordinate system at the snippet pixel time, the vehicle attitude in the earth coordinate system at the snippet pixel time, the snippet pixel azimuth angle in the vehicle coordinate system at the snippet pixel time, the snippet pixel declination angle in the vehicle coordinate system at the snippet pixel time, and the snippet pixel distance from the vehicle at the snippet pixel time, (f) computing 261 a snippet pixel position uncertainty for each of the snippet pixel positions based on the vehicle position uncertainty at the snippet pixel time, an estimate of the snippet pixel azimuth angle uncertainty, an estimate of the snippet pixel declination angle uncertainty, an estimate of the snippet pixel distance uncertainty, and the pixel selection uncertainty, (g) selecting 263 a reference position and a reference time based on the snippet pixel position uncertainties and the snippet pixel times, (h) determining 265 remaining snippet pixels based on the reference position, the remaining snippet pixels each having a remaining pixel's pixel selection uncertainty and a remaining pixel snippet pixel pointing uncertainty at the snippet pixel time, (i) computing 267 a pixel offset based on the reference position and the remaining snippet pixels, (j) computing 269 a remaining snippet pixel position uncertainty for each of the remaining snippet pixels based on the vehicle position uncertainty at the snippet pixel time of the reference position, the remaining pixel snippet pixel pointing uncertainty, and the remaining pixel selection uncertainty; and (k) creating 271 the vehicle position fixes for the target based on the remaining snippet pixels, the reference position, the snippet pixel times, and the remaining snippet pixel position uncertainties.

Method 250 can optionally include selecting a plurality of the targets, and repeating steps (a) through (k) for each of the plurality of targets. Method 250 can further optionally include determining the vehicle position, the vehicle heading, the vehicle attitude, the snippet pixel azimuth angle, the snippet pixel declination angle, and the snippet pixel distance from the vehicle from data logs, computing the snippet pixel pointing uncertainty based on an estimate of the snippet pixel azimuth angle uncertainty, an estimate of the snippet pixel declination angle uncertainty, an estimate of the snippet pixel distance uncertainty, and computing the snippet pixel position uncertainty based on a root mean square of the vehicle position uncertainty at the snippet pixel time, the snippet pixel pointing uncertainty, and the pixel selection uncertainty. Method 250 can still further optionally include determining a lowest of the snippet pixel position uncertainties, identifying the snippet pixel associated with the lowest of the snippet pixel position uncertainties as the reference position, the reference position having the reference time equal to the snippet pixel time for the identified snippet pixel, and computing the pixel offset as a horizontal distance between the reference position and the remaining snippet pixels. Computing the uncertainty using root mean square can be based on the vehicle position uncertainties at the snippet pixel time of the reference position, the remaining pixel snippet pixel pointing uncertainties, and the remaining pixel selection uncertainties. Method 250 can also optionally include computing a remaining snippet pixel uncertainty based on a root mean square of the vehicle position uncertainty at the reference time, the remaining pixel snippet pixel pointing uncertainty, and the remaining pixel's pixel selection uncertainty, for each of the plurality of targets, applying the vehicle position fixes for each of the remaining snippet pixels, and (l) for all of the plurality of targets, determining the target having a largest pixel offset for the remaining snippet pixels associated with the target, (m) applying the vehicle position fixes associated with the determined target, (n) recomputing the vehicle position fixes for the targets except the determined target, and (o) repeating steps (l)-(n) until a maximum of the pixel offsets is less than a pre-selected threshold. Measuring the target size can include manually measuring the target size, or automatically measuring the target size based on major and minor axes of an ellipse surrounding the target.

Referring now to FIG. 4, a conventional UUV survey pattern is shown where a series of track lines 36, 38, and 42, connected by cross lines 43, 47, and 51, are executed by the vehicle, ending with tie-line 35 across parallel lines 36, 38, and 42 that can be used for system self-validation. Swath outlines 39, 41, and 45 illustrate the amount of bottom that is viewed or covered by the sonar as it passes along each parallel line 36, 38, and 42. Swath outlines 39, 41, and 45 can be referred to as the sonar's swath. For UUV surveys that involve acoustic imaging sonars, it is standard practice that there is some overlap between the swaths of adjacent track lines. It is in these overlapping areas that the same bottom object, or target, can be detected more than one time, presenting an opportunity to use the target to reduce position error for the UUV's mission. For example, if a target is seen by the sonar on the left side while driving the line 36 (to the right of line 36 in FIG. 4) at a location that is also within the rectangle 41, there is a possibility that the same target will be seen while driving line 38 (to the left of line 38 in FIG. 4) in the opposite direction. Due to the nature of the seafloor and acoustic imagery, it cannot be guaranteed that the same target will be seen while driving line 38. For this hypothetical set of survey lines 35, 36, 38, and 42, and swaths 37, 39, 41, and 45, if a bottom target lies in overlap 44 or overlap 46, and also in swath 37, then the target could be seen three times.

Referring now primarily to FIG. 5, a hypothetical set of bottom targets at mission times 49 ($a$-$n$) are shown that have been detected using automatic and/or manual detection methods. The mission times are alphabetically ordered based on the mission time that each target at the mission time was acoustically detected, for example. Each target corresponds with a track line 35, 36, 38, and 42 during which it was detected—i.e. at mission times a, b, c and d, targets were detected on track line 36 within overlap area 44 (FIG. 4). At this stage of the process, a time ordered list of bottom targets, the approximate mission times that the targets were detected, and the geographic locations of the targets are known. Some of these detected targets may not be unique, such as the targets at mission times o, g, and k. Due to UUV position error growth, the same target might be seen at a later mission time in a different apparent position.

Figure 6:
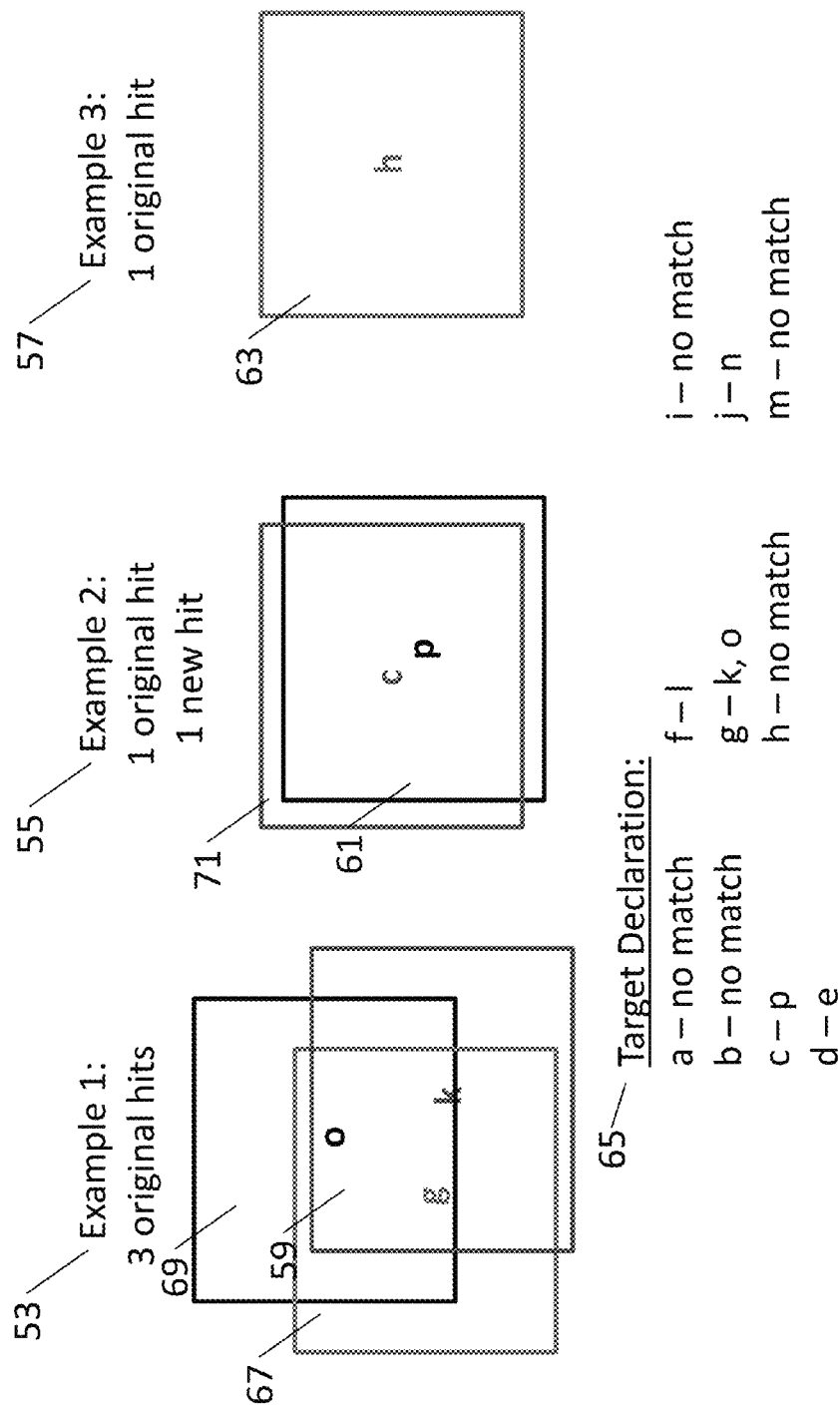
FIG. 6 is graphical depiction of the process steps of geographic matching, snippet generation, and target matching.

Referring now to FIG. 6, three examples are shown of the processing steps for (1) automated geographic matching, i.e. searching for other times in the mission where the same geographic area was covered by the sonar, (2) automated image snippet generation, i.e. extracting a 'sub-image' around (a) each of the targets that were detected in the previous step, and (b) at all other instances of the mission in the same geographic area of a previously detected target—the size of the snippet would normally be dictated based on the UUV navigation system's estimated position uncertainty at the mission time of the target sighting, and (3) target matching and target declaration, i.e. determining if any of the snippets contain the same target at different time instances, and where the same target is seen more than once. First example 53 depicts three different targets detected at different mission times and closely spaced geographically—these could each represent the same target. Boxes 59, 67, and 69 are automatically generated image snippets around each of the detected targets' approximate location, i.e. where they were detected along track lines 35 (FIG. 5) (mission time o), 38 (FIG. 5) (mission time g), and 42 (FIG. 5) (mission time k). The target in each snippet is examined to determine if it is the same as one or both of the other targets. Target examination can be accomplished, for example, by a combination of automatic and manual techniques, purely automatic techniques, and purely manual techniques. Second example 55 depicts snippet 61 generated based on geographic matching revealing object at mission time p that is geographically close to previously detected target at mission time c in snippet 71. Third example 57 depicts snippet 63 having target at mission time h with no geographic matches. Referring back to FIGS. 4 and 5, target at mission time h was detected very close to track line 38, i.e., in an area with no overlap areas.

Continuing to refer to FIG. 6, table 65 of target declarations indicates that targets at mission times a, b, h, i and m have no match and thus are not valid targets for creating a navigation fix. There are four instances where the same target was seen twice (at mission times c-p, d-e, f-l, and j-n) and one instance where the same target was seen three times (at mission times g, k, o). From this exemplary survey, then, five bottom fixes can be generated based on the detected and matched targets. The target declaration process creates the array $\hat{T}_{ij}(t,p)$. This array contains the identified unique targets (index i) found in the group of detected targets and each time instance (index j) of that same target. The hat denotes 'approximate' in that the mission time and position of each instance of each target are only approximate.

Figure 7:
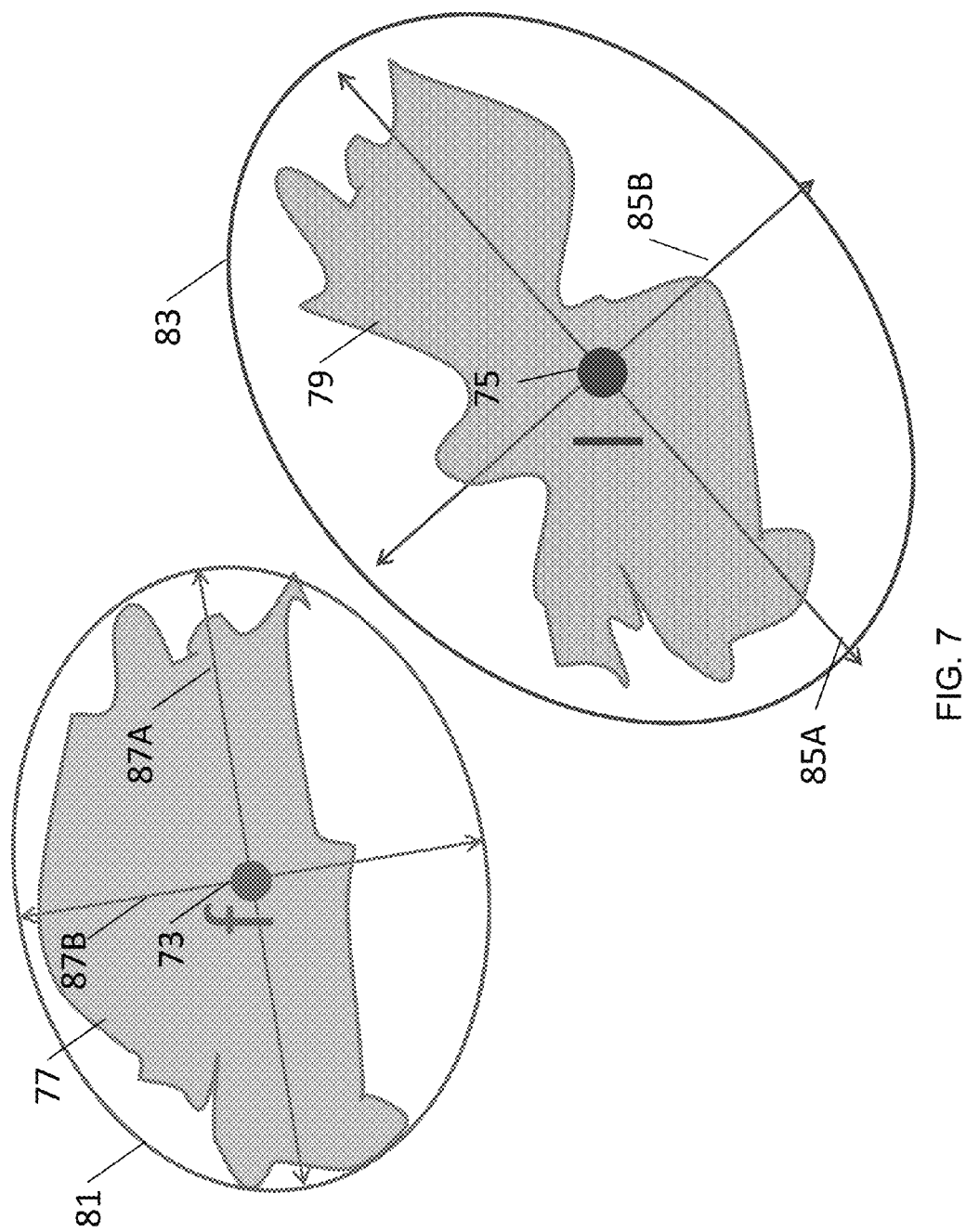
FIG. 7 is a graphical depiction target pixel selection for two objects that have been determined to be the same.

Referring now primarily to FIG. 7, target pixel selection for targets 77 and 79 are depicted (see also FIG. 5). Targets 77 and 79 are found to be the same target at times f and l. Approximate mission times and locations for the targets are accurate enough to generate an image snippet (for example, snippet 59 (FIG. 6)) that encloses the target for subsequent matching analysis. During the target pixel selection process, specific image pixels 73 and 75 are chosen to determine the exact mission times f and l and locations of the targets. Moreover, despite the distortion present in acoustic imagery, an attempt is made to choose the same point on each instance—77 and 79—of the target as time instance f and l location of targets 77 and 79. The appearance of the target at the different mission times f and l is not identical, as is common with acoustic imagery. This fact complicates the selection of the same point on targets 77 and 79 at mission times f and l, and thus can incur position uncertainty. Since the position uncertainty incurred due to pixel selection is necessarily related to the size of the target, during this processing step the target's size is measured for use in estimating the uncertainty. Major —87A and 85A—and minor —87B and 85B—axes of bounding ovals 81 and 83 can be used to estimate the target's size. Measurement of the major and minor axes can be performed manually or automatically by creating a rubber band oval. Pixel selection for an instance j—for example, targets 77 and 79—of target i can provide the exact mission time t for that instance of the target. Mission time t can be stored in array $T_{ij}(t,p,u)$, where p is the position of the selected pixel and u is the position uncertainty of the selected pixel.

Figure 8:
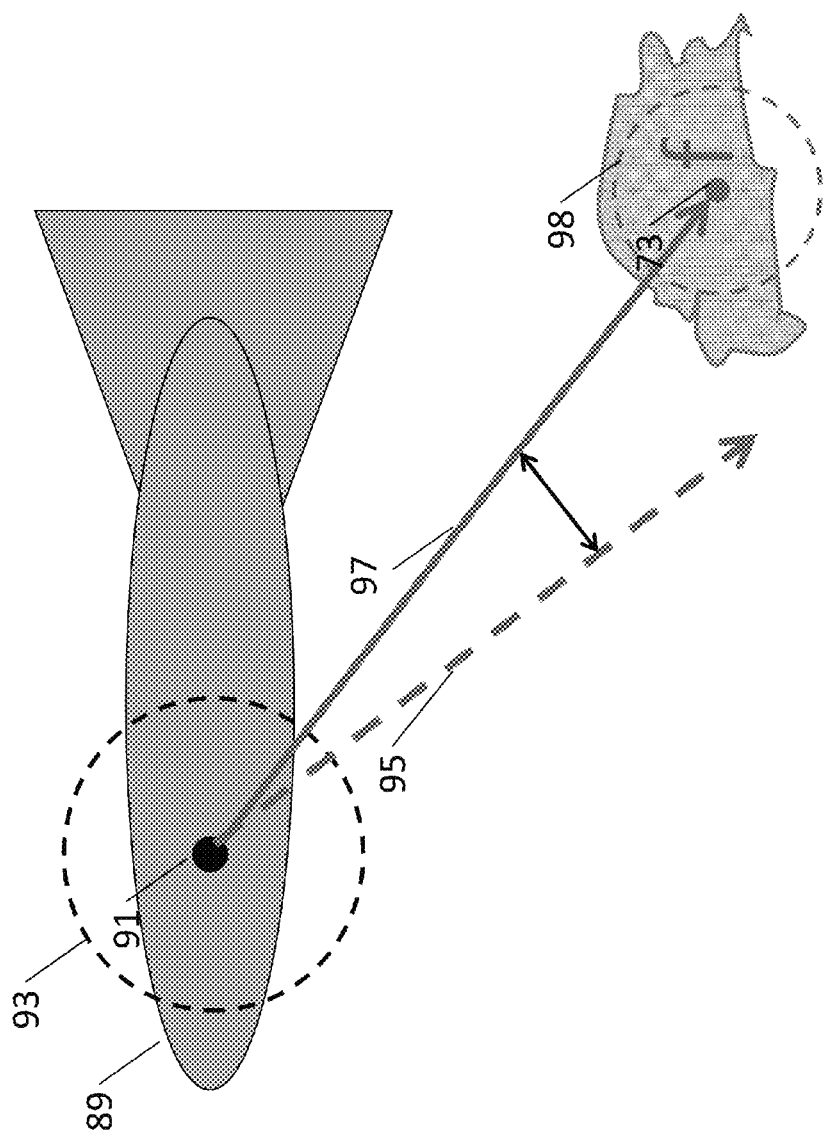
FIG. 8 is a graphical depiction of the process of computing the position and uncertainty for each instance of the same target.

Referring now to FIG. 8, the process of computing the position and uncertainty for each instance of the same target is shown. The position of selected pixel for each instance of the target is computed as the vector sum of the position of UUV 89 at the mission time of selected pixel 73, $V_p(t)$, (obtained and/or estimated from data records) and the target pointing angle and range 97 from UUV 89 to selected pixel 73 at the same time instance, $PNT(r(t), \theta(t))$, where $r(t)$ is range 97 to selected pixel 73 at mission time t and $\theta(t)$ is the three dimensional angle from UUV 89 to selected pixel 73. Accurate estimation of target pixel pointing angle and range (and thus the precise geographic location of selected pixel 73) requires a precision navigation system, a data logging system with sufficient precision in space, time and numerical accuracy, accurate measurement of the distanced and angular offsets of the sonar head with respect to the vehicle's position and attitude reference frame and a sonar system whose generated data retains sufficient information to relate specific pixel 73 to specific mission time f. In addition to the position of the target, the uncertainty of that position is needed for the optimal integration of the resulting position fix using standard navigation system processing approaches (typically using a Kalman filter approach). Uncertainty of the target pixel's position is related to the uncertainty 93 of the position 91 of UUV 89, the uncertainty 95 in the pointing angle and range, and the target pixel selection uncertainty 98. UUV position uncertainty 93 is typically a function of the distance travelled between external position fixes and is computed as a function of mission time by precision navigation systems. UUV position uncertainty 93 can be estimated based on navigation system specifications. Likewise, pointing angle and range uncertainty 95 can be estimated using system specifications. Pixel selection uncertainty can conservatively be estimated a one third the length of target bounding oval 81 (FIG. 7) major axis 87A (FIG. 7). The uncertainty of each instance of a target can be computed using the root mean square:

$$T_{ij}(f,p,u){:}u = T_{ij}(f){:}u = \sqrt{V_{pu}(f)^2 + PNT_u(f)^2 + TarS_u(f)^2}$$

where $T_{ij}(f,p,u)$: u denotes the uncertainty of the $i^{th}$ target's $j^{th}$ instance, and $T_{ij}(f)$: u is shorthand for the same value. So the position uncertainty for target i, instance j (target 77), at mission time f, is the square root of the sum of the squares of UUV position uncertainty 93 at mission time f, pointing uncertainty 95 at mission time f, and pixel selection uncertainty 98 at mission time f for instance j (target 77).

Figure 9:
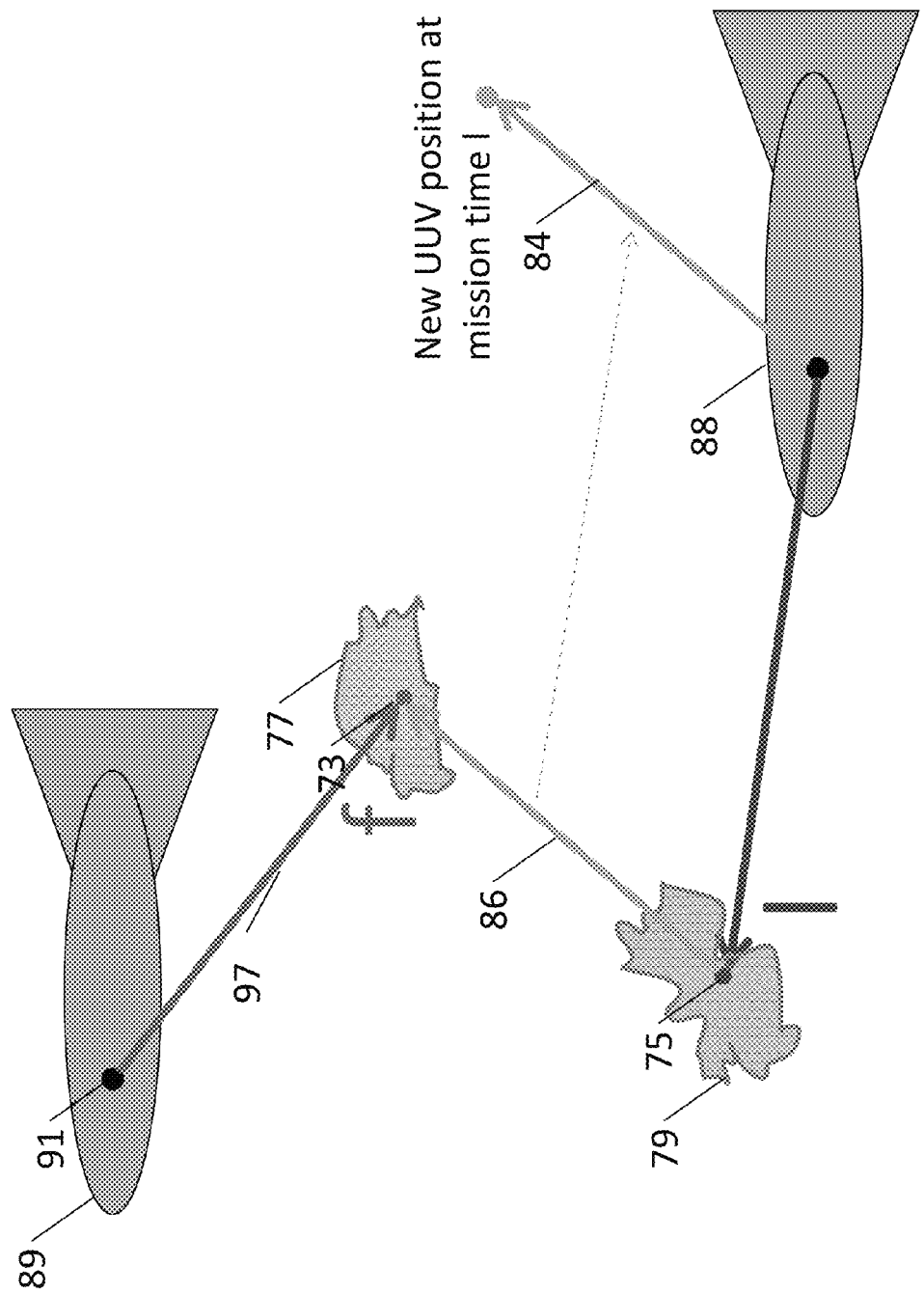
FIG. 9 is a graphical depiction of the process of creating a position fix for a target where the target has instances at mission times f and l.

Referring now to FIG. 9, the next processing step is to create a position fix for each additional time instance, for example, target 79, of the same target. To do this, a reference instance of the target is selected, i.e. the time instance that has the lowest position uncertainty as computed previously. Mathematically this is expressed as: $T_{ir} = T_{ij}(t, p, \min(u))$ $\forall j = T_{ij}$ (f,p,u). For example, target instance 77 can be assumed for explanatory purposes to have the lower position uncertainty. Target 77 sighted at mission time f is found to be the same as target 79 at mission time l. In this analysis, it is assumed that targets 77 and 79 have not moved between mission times f and l. For this example, target 77 at mission time f is said to have the best known position (the least uncertain position). Thus, the position of target 79 at mission time l is changed to the position of target 77 at mission time f, and a position fix for UUV 89 is generated based on the position offset between the location of target 77 at mission time f and target 79 at mission time l. The generated position fix for UUV 89 is applied to the position of UUV 88 at mission time l, providing the location of the position fix for UUV 88 at mission time l. Mathematically the position of UUV 88 for the position fix at mission time l is: Fix $P(l) = V_p(l) + T_{ij}(l){:}p - T_{ir}{:}p$ Since the reference position of each target is chosen to be that time instance having lowest uncertainty, the vehicle position error can be reduced by adjusting the vehicle position for all other time instances of the same target. The uncertainty of this position fix is not simply the uncertainty of the position of the target at mission time f, since at mission time l, the pointing and pixel selection uncertainties are different from at mission time f. The uncertainty of this position fix is computed for time l is computed using vehicle position uncertainty 93 (FIG. 8) at mission time f and the pointing and pixel selection uncertainties at time l (not shown):

$$\text{Fix Unc}(l) = \sqrt{V_{pu}(f)^2 + PNT_u(l)^2 + TarS_u(l)^2}$$

The process outlined above is completed for all other targets that have been identified from the imagery. Following this, the created position fixes are applied using the UUV navigation post-processing software, which treats these fixes like other external fixes. All of these fixes can be applied with a single pass of the post-processing software or they can be applied recursively to take into account, in some cases, that the application of a single bottom target position fix can alter UUV positions throughout the mission, and consequently can alter the perceived positions of all of the other targets and their sightings. The recursive process can proceed as follows: (a) generate the target position fixes 86 for the targets selected as detailed previously; (b) for each target, determine the maximum offset distance for all of that target's additional time instances, $\max(T_{ij}(l){:}p - T_{ir}{:}p) \forall j$; (c) compare the maximum offset distance for each target, and select that target which has the greatest offset distance (and thus will yield the greatest position error reduction at that mission time)—use that target and all its time instances to create UUV position fixes 84; (d) apply those position fixes using navigation post-processing software—this will change both the position and position uncertainty throughout the mission; (e) for the remaining targets, use the new position data to recompute the positions and uncertainties of all their time instances; (f) repeat steps (a) through (e). This process can be terminated when the greatest offset distance (greatest position error reduction) reaches a threshold.

Figure 10A:
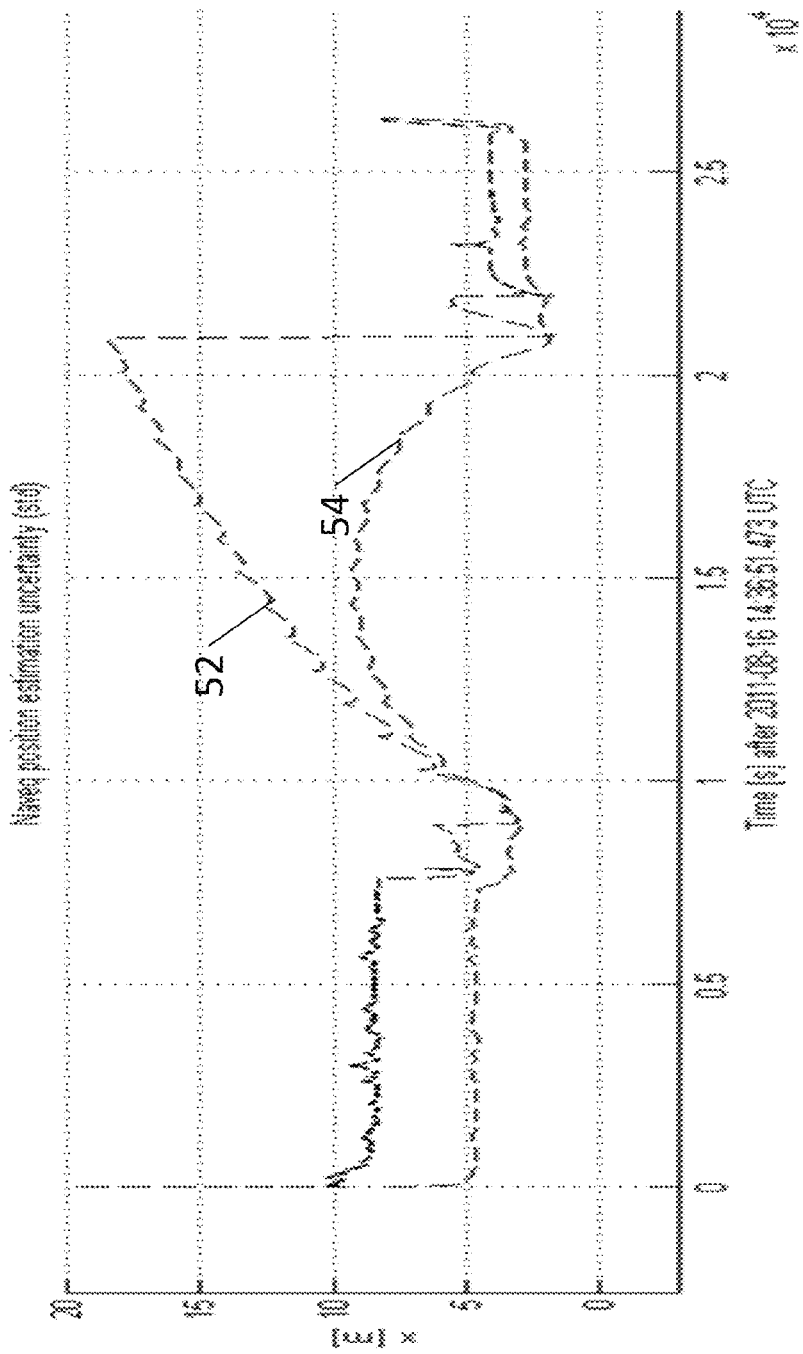
FIG. 10A is a graphical depictions of test results indicating the position estimation uncertainty calculated according to the prior art.

Referring now to FIG. 10A (PRIOR ART), data were obtained from a UUV using a navigation solution with a HiPaP ultra-short baseline (USBL) acoustic positioning as the ground truth. Vehicle position was initialized using an external USBL system at about 8000 seconds and then removed from the navigation solution for the remainder of the mission. Mission position uncertainty 52 and post-mission position uncertainty 54 are shown for the x direction, and smoothed. The middle third portion of the graph shows the underwater travel where position uncertainty 52 grows linearly with time while the vehicle is dead reckoning only. In general, the position uncertainty of a UUV that is dead reckoning, typically using a navigation suite consisting of an inertial sensor and a Doppler Velocity Log(DVL), will grow linearly with the distance travelled between external position fixes. Performance for the y axis was comparable.

Figure 10B:
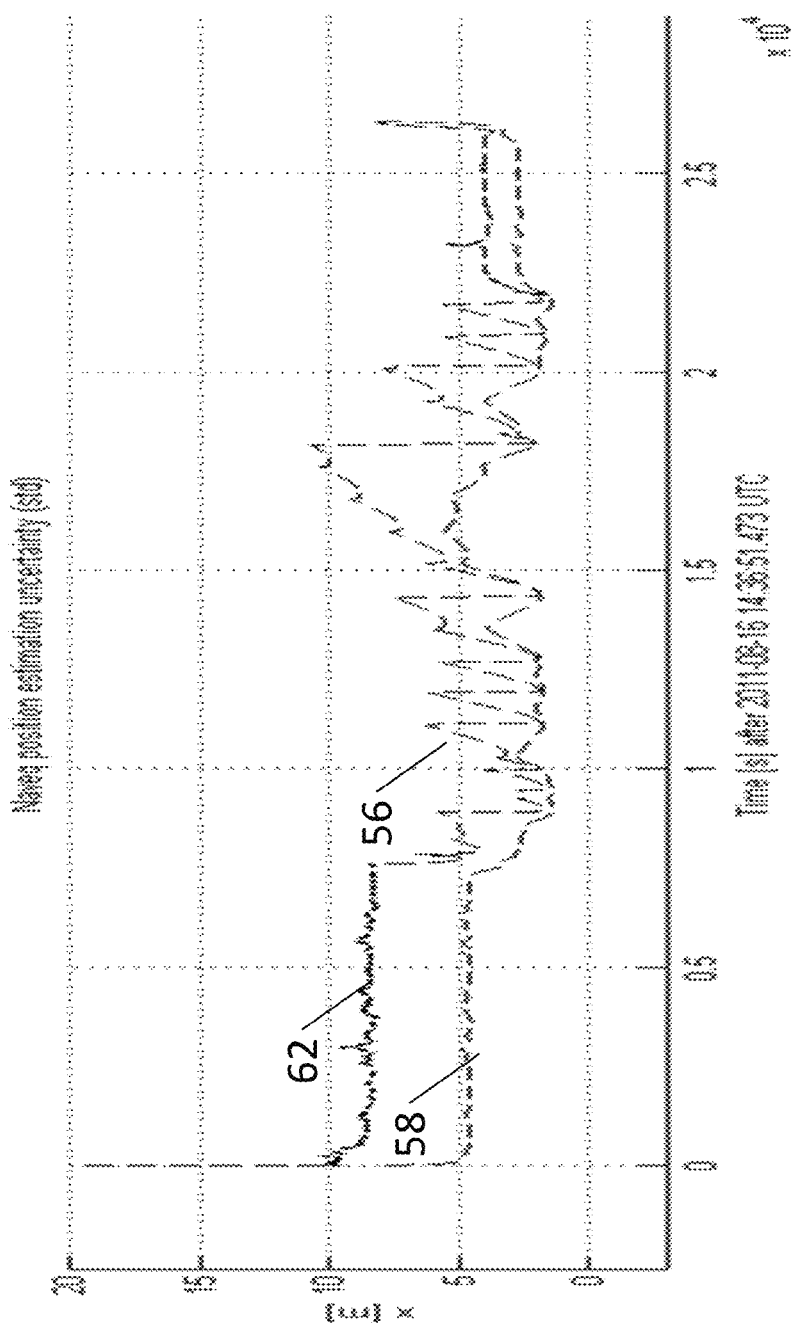
FIG. 10B is a graphical depictions of test results indicating the position estimation uncertainty calculated according to the system and method of the present embodiment.

Referring now to FIG. 10B, the application of ABFN fixes created using detected bottom features is shown. Saw-toothed pattern 56 seen on line 62 illustrates the error improvement realized by using multiple sightings of undersea objects as position fixes to reduce the position uncertainty. The multiple sudden drops on the line 62 correspond to the bottom object fix points. The worst error, approaching ten meters, is after an hour and a half gap between bottom fixes. As shown by the renavigated line 58, the maximum position uncertainty is five meters using bottom fixes as compared with almost ten meters in FIG. 10A.

Figure 11:
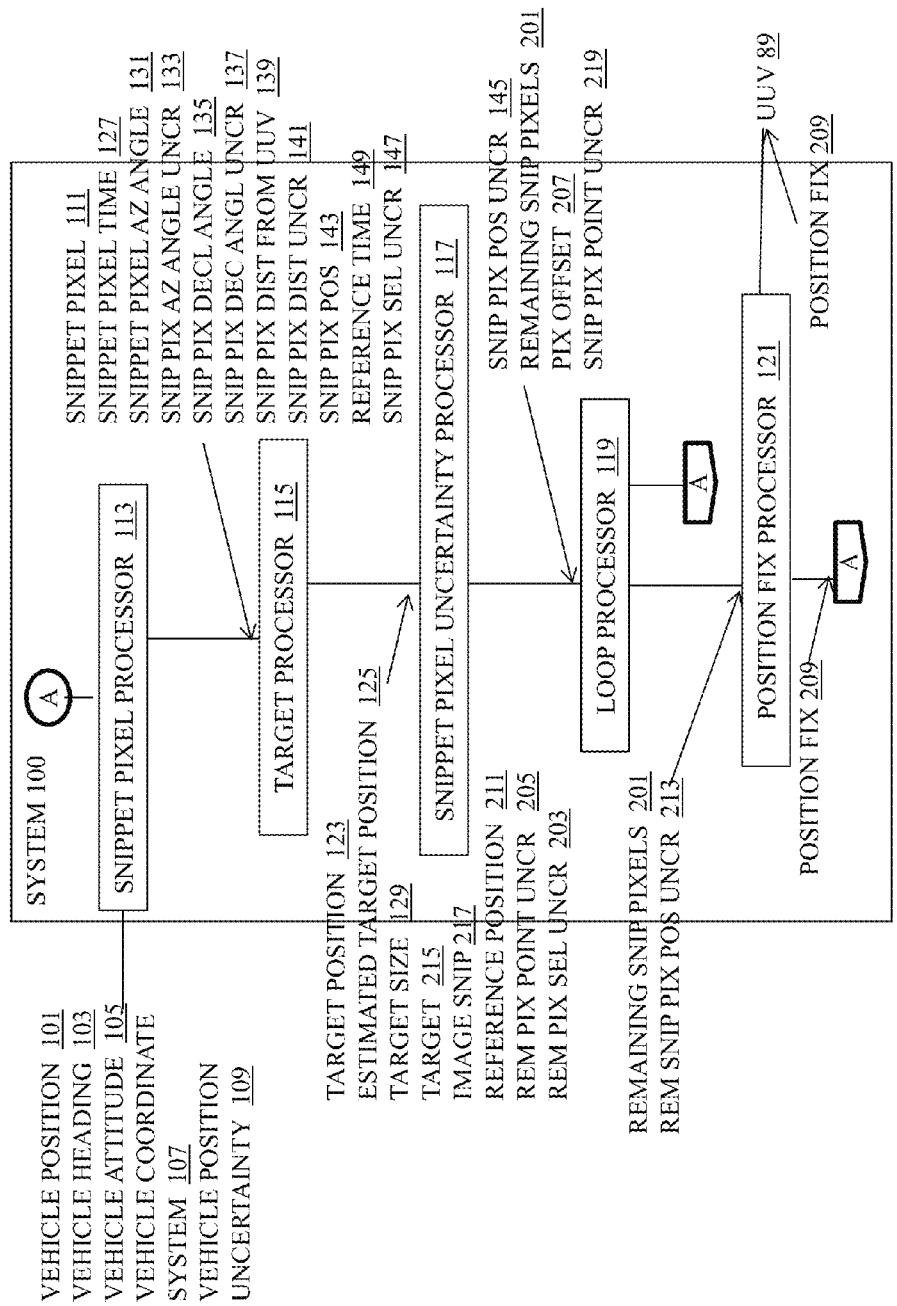
FIG. 11 is a schematic block diagram of an embodiment of the system of the present teachings.

Referring now to FIG. 11, system 100 of the present embodiment for generating vehicle position fixes 209 of vehicle 89 having vehicle position 101, vehicle heading 103, vehicle attitude 105, vehicle coordinate system 107, and vehicle position uncertainty 109, can include, but is not limited to including, snippet pixel processor 113 that selects a snippet pixel 111 from each of a plurality of image snippets 217. The plurality of image snippets 217 is associated with target 215, and target 215 has target position 123. Each of snippet pixels 111 is associated with estimated target position 125, snippet pixel time 127, and target size 129 of target 215 and each of snippet pixels 111 has snippet pixel azimuth angle 131, snippet pixel azimuth angle uncertainty 133, snippet pixel declination angle 135, snippet pixel declination angle uncertainty 137, snippet pixel distance 139 from UUV 89, and snippet pixel distance uncertainty 141. Snippet pixel processor 113 can compute snippet pixel position 143 in an earth coordinate system at snippet pixel time 127 for each of snippet pixels 111 based on UUV position 101 in the earth coordinate system at snippet pixel time 127, vehicle heading 103 in the earth coordinate system at snippet pixel time 127, vehicle attitude 105 in the earth coordinate system at snippet pixel time 127, snippet pixel azimuth angle 131 in the vehicle coordinate system at snippet pixel time 127, snippet pixel declination angle 135 in the vehicle coordinate system at snippet pixel time 127, and snippet pixel distance 139 from the vehicle at snippet pixel time 127. System 100 can also include target processor 115 measuring target size 129, and snippet pixel uncertainty processor 117 computing pixel selection uncertainty 147 for snippet pixel 111 based on measured target size 129. Snippet pixel uncertainty processor 117 can also compute snippet pixel position uncertainty 145 for each of snippet pixel position 143 based on vehicle position uncertainty 109 at snippet pixel time 127, an estimate of snippet pixel azimuth angle uncertainty 133, an estimate of snippet pixel declination angle uncertainty 137, an estimate of snippet pixel distance uncertainty 141, and pixel selection uncertainty 147. Snippet pixel uncertainty processor 117 can also select reference position 211 and reference time 149 based on snippet pixel position uncertainties 145 and snippet pixel times 127, and can determine remaining snippet pixels 201 based on reference position 211, where remaining snippet pixels 201 each has remaining pixel selection uncertainty 203 and remaining pixel snippet pixel pointing uncertainty 205 at reference time 149. Snippet pixel uncertainty processor 117 can also compute pixel offset 207 based on reference position 211 and remaining snippet pixels 201, and can compute remaining snippet pixel position uncertainty 213 for each of remaining snippet pixels 201 based on vehicle position uncertainty 109 at snippet pixel time 127 of reference position 211, remaining pixel snippet pixel pointing uncertainty 205, and remaining pixel selection uncertainty 203. System 100 can further include loop processor 119 activating snippet pixel processor 113, target processor 115, and snippet pixel uncertainty processor 117 for each of the plurality of image snippets 217. System 100 can still further include position fix processor 121 creating vehicle position fixes 209 for target 215 based on remaining snippet pixels 201, reference position 211, snippet pixel times 127, and remaining snippet pixel position uncertainties 213.

Continuing to refer to FIG. 11, target processor 115 can include, but is not limited to including, a target selector selecting a plurality of targets 215, and activating snippet pixel processor 113, target processor 115, loop processor 119, uncertainty processor 117, and position fix processor 121 for each of the plurality of targets 215. Snippet pixel processor 113 can include, but is not limited to including, a vehicle processor determining vehicle position 101, vehicle heading 103, vehicle attitude 105, snippet pixel azimuth angle 131, snippet pixel declination angle 135, and snippet pixel distance 139 from the vehicle from data logs. Snippet pixel processor 113 can further include a pixel offset processor computing pixel offset 207 as a horizontal distance between reference position 211 and remaining snippet pixels 201. Snippet pixel uncertainty processor 117 can include, but is not limited to including, computer code configured to compute snippet pixel pointing uncertainty 219 based on an estimate of snippet pixel azimuth angle uncertainty 133, an estimate of snippet pixel declination angle uncertainty 137, an estimate of snippet pixel distance uncertainty 141. Snippet pixel uncertainty processor 117 can compute snippet pixel position uncertainty 145 based on a root mean square of vehicle position uncertainty 109 at snippet pixel time 127, snippet pixel pointing uncertainty 219, and pixel selection uncertainty 147. Snippet pixel uncertainty processor 117 can further include a snippet pixel identifier that can determine a lowest of snippet pixel position uncertainties 145, and can identify snippet pixel 111 associated with the lowest of snippet pixel position uncertainties 145 as reference position 211. Reference position 211 can have reference time 149 equal to snippet pixel time 127 for the identified snippet pixel 111. Position fix processor 121 can include a correction processor configured to apply vehicle position fixes 209 for each of remaining snippet pixels 201, and can, for each of the plurality of targets 215, apply vehicle position fixes 209 for each remaining snippet pixel 201. Position fix processor 121 can further include a correction processor that can (t) for all of the plurality of targets 215, determine the target 215 having a largest pixel offset 207 for remaining snippet pixels 201 associated with target 215, (u) apply vehicle position fixes 209 associated with determined target 215, (v) recompute vehicle position fixes 209 for targets 215 except the determined target 215, and (w) repeat steps (t)-(v) until a maximum of pixel offsets 207 is less than a pre-selected threshold.

Although the present teachings have been described with respect to various embodiments, it should be realized these teachings are also capable of a wide variety of further and other embodiments.

What is claimed is:

1. A computer-based method for generating vehicle position fixes of a vehicle having a vehicle position, a vehicle heading, a vehicle attitude, a vehicle coordinate system, and a vehicle position uncertainty, comprising:
   (a) selecting a snippet pixel from each of a plurality of image snippets, the plurality of image snippets being associated with a target, the target having a target position, each of the snippet pixels being associated with an estimated target position, a snippet pixel time, and a target size of the target, each of the snippet pixels having a snippet pixel azimuth angle, a snippet pixel azimuth angle uncertainty, a snippet pixel declination angle, a snippet pixel declination angle uncertainty, a snippet pixel distance from the vehicle, and a snippet pixel distance uncertainty;
   (b) measuring the target size;
   (c) computing a pixel selection uncertainty for the snippet pixel based on the measured target size;
   (d) repeating steps (a)-(c) for each of the plurality of snippets;
   (e) computing a snippet pixel position in an earth coordinate system at the snippet pixel time for each of the snippet pixels based on the vehicle position in the earth coordinate system at the snippet pixel time, the vehicle heading in the earth coordinate system at the snippet pixel time, the vehicle attitude in the earth coordinate system at the snippet pixel time, the snippet pixel azimuth angle in the vehicle coordinate system at the snippet pixel time, the snippet pixel declination angle in the vehicle coordinate system at the snippet pixel time, and the snippet pixel distance from the vehicle at the snippet pixel time;
   (f) computing a snippet pixel position uncertainty for each of the snippet pixel positions based on the vehicle position uncertainty at the snippet pixel time, an estimate of the snippet pixel azimuth angle uncertainty, an estimate of the snippet pixel declination angle uncertainty, an estimate of the snippet pixel distance uncertainty, and the pixel selection uncertainty;
   (g) selecting a reference position and a reference time based on the snippet pixel position uncertainties and the snippet pixel times;
   (h) determining remaining snippet pixels based on the reference position, the remaining snippet pixels each having a remaining pixel's pixel selection uncertainty and a remaining pixel snippet pixel pointing uncertainty at the snippet pixel time;
   (i) computing a pixel offset based on the reference position and the remaining snippet pixels;
   (j) computing a remaining snippet pixel position uncertainty for each of the remaining snippet pixels based on the vehicle position uncertainty at the snippet pixel time of the reference position, the remaining pixel snippet pixel pointing uncertainty, and the remaining pixel selection uncertainty; and
   (k) creating the vehicle position fixes for the target based on the remaining snippet pixels, the reference position, the snippet pixel times, and the remaining snippet pixel position uncertainties.

2. The method as in claim 1 further comprising: selecting a plurality of the targets; and repeating steps (a) through (k) for each of the plurality of targets.

3. The method as in claim 1 further comprising:
determining the vehicle position, the vehicle heading, the vehicle attitude, the snippet pixel azimuth angle, the snippet pixel declination angle, and the snippet pixel distance from the vehicle from data logs.

4. The method as in claim 1 further comprising:
computing the snippet pixel pointing uncertainty based on an estimate of the snippet pixel azimuth angle uncertainty, an estimate of the snippet pixel declination angle uncertainty, an estimate of the snippet pixel distance uncertainty; and
computing the snippet pixel position uncertainty based on a root mean square of the vehicle position uncertainty at the snippet pixel time, the snippet pixel pointing uncertainty, and the pixel selection uncertainty.

5. The method as in claim 1 further comprising:
determining a lowest of the snippet pixel position uncertainties; and
identifying the snippet pixel associated with the lowest of the snippet pixel position uncertainties as the reference position, the reference position having the reference time equal to the snippet pixel time for the identified snippet pixel.

6. The method as in claim 1 further comprising:
computing the pixel offset as a horizontal distance between the reference position and the remaining snippet pixels.

7. The method as in claim 1 computing the uncertainty using root mean square based on the vehicle position uncertainties at the snippet pixel time of the reference position, the remaining pixel snippet pixel pointing uncertainties, and the remaining pixel's pixel selection uncertainties.

8. The method as in claim 1 further comprising:
computing a remaining snippet pixel uncertainty based on a root mean square of the vehicle position uncertainty at the reference time, the remaining pixel snippet pixel pointing uncertainty, and the remaining pixel's pixel selection uncertainty.

9. The method as in claim 2 further comprising:
for each of the plurality of targets, applying the vehicle position fixes for each of the remaining snippet pixels.

10. The method as in claim 1 further comprising:
(l) for all of the plurality of targets, determining the target having a largest pixel offset for the remaining snippet pixels associated with the target;
(m) applying the vehicle position fixes associated with the determined target;
(n) recomputing the vehicle position fixes for the targets except the determined target; and
(o) repeating steps (l)-(n) until a maximum of the pixel offsets is less than a pre-selected threshold.

11. The method as in claim 1 wherein measuring the target size comprises:
automatically measuring the target size based on major and minor axes of an ellipse surrounding the target.

12. A computer system for generating vehicle position fixes of a vehicle having a vehicle position, a vehicle heading, a vehicle attitude, a vehicle coordinate system, and a vehicle position uncertainty, comprising:
a snippet pixel processor selecting a snippet pixel from each of a plurality of image snippets, the plurality of image snippets being associated with a target, the target having a target position, each of the snippet pixels being associated with an estimated target position, a snippet pixel time, and a target size of the target, each of the snippet pixels having a snippet pixel azimuth angle, a snippet pixel azimuth angle uncertainty, a snippet pixel declination angle, a snippet pixel declination angle uncertainty, a snippet pixel distance from the vehicle, and a snippet pixel distance uncertainty, the snippet pixel processor computing a snippet pixel position in an earth coordinate system at the snippet pixel time for each of the snippet pixels based on the vehicle position in the earth coordinate system at the snippet pixel time, the vehicle heading in the earth coordinate system at the snippet pixel time, the vehicle attitude in the earth coordinate system at the snippet pixel time, the snippet pixel azimuth angle in the vehicle coordinate system at the snippet pixel time, the snippet pixel declination angle in the vehicle coordinate system at the snippet pixel time, and the snippet pixel distance from the vehicle at the snippet pixel time;
a target processor measuring the target size;
a snippet pixel uncertainty processor computing a pixel selection uncertainty for the snippet pixel based on the measured target size, the snippet pixel uncertainty processor computing a snippet pixel position uncertainty for each of the snippet pixel positions based on the vehicle position uncertainty at the snippet pixel time, an estimate of the snippet pixel azimuth angle uncertainty, an estimate of the snippet pixel declination angle uncertainty, an estimate of the snippet pixel distance uncertainty, and the pixel selection uncertainty, the snippet pixel uncertainty processor selecting a reference position and a reference time based on the snippet pixel position uncertainties and the snippet pixel times, determining remaining snippet pixels based on the reference position, the remaining snippet pixels each having a remaining pixel's pixel selection uncertainty and a remaining pixel snippet pixel pointing uncertainty at the snippet pixel time, computing a pixel offset based on the reference position and the remaining snippet pixels, and computing a remaining snippet pixel position uncertainty for each of the remaining snippet pixels based on the vehicle position uncertainty at the snippet pixel time of the reference position, the remaining pixel snippet pixel pointing uncertainty, and the remaining pixel selection uncertainty;
a loop processor activating the snippet pixel processor, the target processor, and the snippet pixel uncertainty processor for each of the plurality of image snippets;
a position fix processor creating the vehicle position fixes for the target based on the remaining snippet pixels, the reference position, the snippet pixel times, and the remaining snippet pixel position uncertainties.

13. The system as in claim 12 wherein the target processor comprises:
a target selector selecting a plurality of the targets, and activating the snippet pixel processor, the target processor, the loop processor, the uncertainty processor, and the position fix processor for each of the plurality of targets.

14. The system as in claim 12 wherein the snippet pixel processor comprises:
a vehicle processor determining the vehicle position, the vehicle heading, the vehicle attitude, the snippet pixel azimuth angle, the snippet pixel declination angle, and the snippet pixel distance from the vehicle from data logs.

15. The system as in claim 12 wherein the snippet pixel uncertainty processor comprises computer code configured to compute the snippet pixel pointing uncertainty based on an estimate of the snippet pixel azimuth angle uncertainty, an estimate of the snippet pixel declination angle uncertainty, an estimate of the snippet pixel distance uncertainty, and compute the snippet pixel position uncertainty based on a root mean square of the vehicle position uncertainty at the reference time, the snippet pixel pointing uncertainty, and the pixel selection uncertainty.

16. The system as in claim 12 wherein the snippet pixel uncertainty processor comprises:
   a snippet pixel identifier determining a lowest of the snippet pixel position uncertainties, and identifying the snippet pixel associated with the lowest of the snippet pixel position uncertainties as the reference position, the reference position having the reference time equal to the snippet pixel time for the identified snippet pixel.

17. The system as in claim 12 where the snippet pixel processor comprises:
   a pixel offset processor computing the pixel offset as a horizontal distance between the reference position and the remaining snippet pixels.

18. The system as in claim 12 wherein the position fix processor comprises:
   a correction processor configured to:
      apply the vehicle position fixes for each of the remaining snippet pixels; and
      for each of the plurality of targets, apply the vehicle position fixes for each of the remaining snippet pixels.

19. The system as in claim 12 wherein the position fix processor comprises:
   a correction processor configured to:
      (t) for all of the plurality of targets, determine the target having a largest pixel offset for the remaining snippet pixels associated with the target;
      (u) apply the vehicle position fixes associated with the determined target;
      (v) recompute the vehicle position fixes for the targets except the determined target; and
      (w) repeat steps (t)-(v) until a maximum of the pixel offsets is less than a pre-selected threshold.

* * * * *